US011053807B2

(12) United States Patent
Momma et al.

(10) Patent No.: US 11,053,807 B2
(45) Date of Patent: Jul. 6, 2021

(54) AXIAL FLOW ROTATING MACHINE

(71) Applicant: Mitsubishi Hitachi Power Systems, Ltd., Yokohama (JP)

(72) Inventors: Kazuhiro Momma, Yokohama (JP); Shigeki Senoo, Yokohama (JP)

(73) Assignee: MITSUBISHI POWER, LTD., Yokohama (JP)

(*) Notice: Subject to any disclaimer, the term of this patent is extended or adjusted under 35 U.S.C. 154(b) by 19 days.

(21) Appl. No.: 16/619,660

(22) PCT Filed: Jun. 6, 2018

(86) PCT No.: PCT/JP2018/021706
§ 371 (c)(1),
(2) Date: Dec. 5, 2019

(87) PCT Pub. No.: WO2018/230411
PCT Pub. Date: Dec. 20, 2018

(65) Prior Publication Data
US 2020/0157957 A1    May 21, 2020

(30) Foreign Application Priority Data

Jun. 12, 2017   (JP) .............................. JP2017-115364

(51) Int. Cl.
*F01D 9/04*       (2006.01)
*F01D 11/08*    (2006.01)
(Continued)

(52) U.S. Cl.
CPC .............. *F01D 9/041* (2013.01); *F01D 11/08* (2013.01); *F01D 11/02* (2013.01); *F01D 25/24* (2013.01);
(Continued)

(58) Field of Classification Search
CPC ........ F01D 9/041; F01D 11/001; F01D 11/02; F01D 11/08; F01D 25/24; F16J 15/44;
(Continued)

(56) References Cited

U.S. PATENT DOCUMENTS 3,529,904 A    9/1970  Scalzo et al.
8,038,399 B1 * 10/2011  Liang ..................... F01D 11/04
                                                                416/95

(Continued)

FOREIGN PATENT DOCUMENTS

EP          2292897 A1      3/2011
JP        H06-323105 A    11/1994
(Continued)

OTHER PUBLICATIONS

International Search Report dated Aug. 28, 2018, issued in counterpart Application No. PCT/JP2018/021706, with English translation. (4 pages).

(Continued)

*Primary Examiner* — Igor Kershteyn
(74) *Attorney, Agent, or Firm* — Westerman, Hattori, Daniels & Adrian, LLP

(57) ABSTRACT

An axial flow rotating machine includes: a rotor; a plurality of vanes; and a medium flow modification member. Each of the vanes has an inner shroud and one or more seal fins. An annular groove, which is recessed toward a radially inner side, in which the inner shroud and the seal fins are placed in a non-contact manner, is formed at a rotor shaft. A distance from an end of the inner shroud on a furthest axially downstream side to a downstream-side groove side surface is a distance (L). A distance (Lf) from a most-downstream seal fin to a medium flow modification surface is equal to or less than the distance (L) in the axially downstream side.

16 Claims, 14 Drawing Sheets

(51) Int. Cl.
  *F01D 11/02* (2006.01)
  *F01D 25/24* (2006.01)
  *F02C 7/28* (2006.01)
  *F16J 15/447* (2006.01)

(52) U.S. Cl.
  CPC ............ *F02C 7/28* (2013.01); *F05D 2220/31* (2013.01); *F05D 2240/12* (2013.01); *F05D 2240/55* (2013.01); *F16J 15/4472* (2013.01)

(58) Field of Classification Search
  CPC ..... F16J 15/4472; F02C 7/28; F05D 2220/31; F05D 2240/12; F05D 2240/55; F05D 2250/314
  See application file for complete search history.

(56) References Cited

U.S. PATENT DOCUMENTS

| | | | |
|---|---|---|---|
| 2008/0056895 A1* | 3/2008 | Senoo | F01D 5/143 415/199.4 |
| 2011/0150640 A1* | 6/2011 | Tiemann | F01D 11/02 415/191 |
| 2012/0321449 A1 | 12/2012 | Matsumoto et al. | |
| 2015/0354391 A1 | 12/2015 | Li et al. | |
| 2016/0186665 A1* | 6/2016 | Johnson | F01D 11/04 415/168.2 |

FOREIGN PATENT DOCUMENTS

| | | |
|---|---|---|
| JP | 2005-146977 A | 6/2005 |
| JP | 2005-214051 A | 8/2005 |
| JP | 2006-138259 A | 6/2006 |
| JP | 2008-057416 A | 3/2008 |
| JP | 2011-174451 A | 9/2011 |
| JP | 5911151 B2 | 4/2016 |
| WO | 01/81731 A1 | 11/2001 |

OTHER PUBLICATIONS

Written Opinion dated Aug. 28, 2018, issued in counterpart Application No. PCT/JP2018/021706, with English translation. (9 pages).

* cited by examiner

AXIAL FLOW ROTATING MACHINE

TECHNICAL FIELD

The present invention relates to an axial flow rotating machine provided with a rotor that is rotated by a working medium and a casing that covers an outer circumferential side of the rotor.

Priority is claimed on Japanese Patent Application No. 2017-115364 filed Jun. 12, 2017, the content of which is incorporated herein by reference.

BACKGROUND ART

A steam turbine, which is a kind of axial flow rotating machine, includes a rotor that rotates about an axial line, a casing that covers an outer circumferential side of the rotor, and a plurality of vanes that are provided inside the casing. The rotor has, around an axial line, a rotor shaft that is elongated in an axial line direction which the axial line extends and a plurality of blades that are secured to the rotor shaft. The blades have blade bodies with blade shapes and platforms. The platforms are secured to the rotor shaft. Also, the vanes have vane bodies with vane shapes and inner shrouds. An annular groove with an annular shape is formed at the rotor shaft around the axial line to be recessed inward in a radial direction with respect to the axial line. The inner shrouds of the vanes are placed in the annular groove in a non-contact manner. A space in which the respective blade bodies of the plurality of blades and the respective vane bodies of the plurality of vanes are present in the casing is an annular space around the axial line. The annular space forms a steam main flow path through which steam flows.

In the steam turbine with the configuration described above, some steam that has flowed into the casing leaks from a cavity inlet port into the annular groove and flows in as leaking steam in a process of passing through the steam main flow path. The leaking steam passes between the inner shroud and a groove bottom surface of the annular groove and returns from a cavity outlet port to the vapor main flow path. Also, the cavity inlet port is a portion of an opening of the annular groove on an axially upstream side beyond the inner shrouds. In addition, the cavity outlet port is a portion of the opening of the annular groove on an axially downstream side beyond the inner shrouds. The leaking steam that has passed between the inner shrouds and the groove bottom surface of the annular groove and is directed to the cavity outlet port contains a flow-rate component in the radial direction. In the leaking steam, a flow of leaking steam along a downstream-side groove side surface of the annular groove has a larger flow rate component in the radial direction than a flow of leaking steam from the downstream-side groove side surface away on the axially upstream side. A main steam in the steam main flow path is directed to the axially downstream side. Leaking steam directed from the radially inner side toward the radially outer side flows into the flow of the main steam flowing on the radially downstream side in the steam main flow path. As a result, a secondary flow that is a complicated flow is generated on the downstream side beyond a portion at which the main steam and the leaking steam are mixed.

If the secondary flow is generated in the steam main flow path, efficiency of the steam turbine is degraded. Therefore, according to Patent Document 1 described below, a fin extending from a groove bottom surface of an annular groove to a radially outer side is provided in order to curb a secondary flow loss. The fin is disposed between an inner shroud and a downstream-side side surface of the annular groove in an axial line direction. According to the technology disclosed in Patent Document 1, the secondary flow loss is curbed by curbing a flow rate component in a radial direction in a flow of a leaking steam along a downstream-side side surface of the annular groove due to presence of the fin.

CITATION LIST

Patent Document

Patent Document 1

European Patent Application Publication No. 2292897

SUMMARY OF INVENTION

Technical Problem

In the field of axial flow rotating machines, it is desirable to further improve efficiency of axial flow rotating machines.

Thus, an objective of the invention is to provide a technology that enables further curbing of a secondary flow loss and further enhancement of efficiency of an axial flow rotating machine.

Solution to Problem

In order to achieve the aforementioned objective, an axial flow rotating machine according to a first aspect of the invention includes: a rotor that is configured to rotate about an axial line; a casing that covers an outer circumferential side of the rotor; a plurality of vanes that are provided inside the casing and are aligned in a circumferential direction with respect to the axial line; and a medium flow modification member that has a medium flow modification surface extending in a radial direction with respect to the axial line. The casing has a medium inlet portion that guides a working medium into the casing and a medium outlet that is located on an axially downstream side that is a downstream side in an axial line direction, in which the axial line extends, beyond the medium inlet port. The rotor has, around the axial line, a rotor shaft that is elongated in an axial line direction, in which the axial line extends, and a plurality of blades that are aligned in the circumferential direction and are secured to the rotor shaft. Both the plurality of vanes and the plurality of blades are disposed between the medium inlet port and the medium outlet port in the axial direction. The plurality of blades are disposed on the axially downstream side beyond the plurality of vanes. Each of the plurality of vanes has a vane body that extends in the radial direction and has a vane shape, an inner shroud that is provided on a radially inner side with respect to the axial direction of the vane body, and one or more seal fins that are provided on the radially inner side of the inner shroud. An annular groove, which is recessed toward the radially inner side and has an annular shape around the axial line, and in which the inner shroud and the one or more seal fins are placed in a non-contact manner, is formed at the rotor shaft. The annular groove has a groove bottom surface that is directed to the radially outer side with respect to the axial line and a downstream-side groove side surface that spreads from an end of the groove bottom surface on the axially downstream side toward the radially outward. The medium flow modification surface is directed to an axially upstream side that is on a side opposite to the axially downstream side in the axial line direction and spreads from the groove bottom surface toward the radially outward. A distance from an end of the inner shroud on the furthest axially downstream side to the downstream-side groove side surface in the axial line direction is a distance L. The medium flow modification surface is disposed on the axially upstream side beyond the downstream-side groove side surface. A distance Lf from a most-downstream seal fin on the furthest axially downstream side among the one or more seal fins to the medium flow modification surface is equal to or less than the distance L on the axially downstream side.

In the axial flow rotating machine, a part of a main medium flowing through the medium main flow path flows into the annular groove as a leaking medium from the cavity inlet port of the opening of the annular groove on the axially upstream side beyond the inner shroud. The leaking medium flows toward the axially downstream side between the inner shroud and the groove bottom surface of the annular groove. The leaking medium that has passed between the inner shroud and the groove bottom surface of the annular groove flows mainly to the radially outer side between the downstream-side end surface of the inner shroud and the downstream-side groove side surface of the annular groove. Then, the leaking medium returns from the cavity outlet port of the opening of the annular groove on the axially downstream side beyond the inner shroud into the medium main flow path.

The leaking medium is mixed into a flow of a main medium flowing through the medium main flow path toward the axially downstream side. As a result, a secondary flow that is a complicated flow is generated on a downstream side beyond a portion at which the main medium and the leaking medium are mixed. If the secondary flow is generated in the medium main flow path, efficiency of the axial flow rotating machine is degraded.

If the leaking medium passing between the inner shroud and the groove bottom surface of the annular grove and flowing to the axially downstream aide meets the downstream-side groove side surface of the annular groove, the leaking medium mainly flows substantially to the radially outer side along the downstream-side groove side surface. Therefore, if the leaking medium flowing to the axially downstream side meets the downstream-side groove side surface of the annular groove, a leaking medium flowing to the radially outer side along the downstream-side groove side surface in the leaking medium flowing between the downstream-side end surface of the inner shroud and the downstream-side groove side surface of the annular groove has a higher flow rate component in the radial direction than that of a leaking medium flowing to the radially outward side at a position away from the downstream-side groove side surface on the axially upstream side.

In the axial flow rotating machine according to the aspect, the leaking medium that has passed between an end of the most-downstream seal fin among the one or more seal fins on the radially inner side and the groove bottom surface of the annular groove mainly flows to the axially downstream side along the groove bottom surface. The leaking medium meets the medium flow modification surface that is present on the axially upstream side beyond the downstream-side groove side surface. If the leaking medium meets the medium flow modification surface, the leaking medium mainly flows substantially to the radially outer side along the medium flow modification surface. The leaking medium then flows mainly to the radially outer side between the downstream-side end surface of the inner shroud and the downstream-side groove side surface of the annular groove. Then, the leaking medium returns to the inside of the medium main flow path through the cavity outlet port.

In the axial flow rotating machine according to the aspect, since the one or more seal fins are provided at the inner shroud, the flow of the leaking medium that has passed between the end of the most-downstream seal fin on the radially inner side and the groove bottom surface of the annular groove becomes a flow mainly along the groove bottom surface as described above. Therefore, it is possible to cause a large part of the leaking medium that has passed between the seal surface of the inner shroud and the groove bottom surface of the annular groove to meet the medium flow modification surface. Therefore, according to the axial flow rotating machine in the aspect, it is possible to increase the flow amount of the leaking medium flowing substantially to the radially outer side along the medium flow modification surface.

Further, according to the axial flow rotating machine in the aspect, since the distance from the most-downstream seal fin to the medium flow modification surface in the axial line direction is equal to or less than the distance L from the end of the inner shroud on the furthest axially downstream side to the downstream-side groove side surface in the axial line direction, it is possible to change the flow of the main leaking medium to a flow to the radially outer side at a position on the axially upstream side beyond the downstream-side groove side surface.

Therefore, according to the axial flow rotating machine in the aspect, the flow amount of the leaking medium flowing to the radially outer side along the downstream-side groove side surface decreases, and the flow rate of the leaking medium in the radial direction also decreases. Meanwhile, according to the axial flow rotating machine in the aspect, the flow amount of the leaking medium flowing to the radially outer side at a position away from the downstream-side groove side surface on the axially upstream side increases, and a flow rate of the leaking medium in the radial direction also increases. That is, according to the axial flow rotating machine in the aspect, flow rate distribution in regard to the flow of the leaking medium in the radial direction at the cavity outlet port is uniformized, and the maximum flow rate in the radial direction also decreases.

Therefore, it is possible to curb a secondary flow loss and thereby to enhance efficiency of the axial flow rotating machine according to the axial flow rotating machine in the aspect. Further, since the one or more seal fins are provided at the inner shroud, it is possible to curb the flow amount of the leaking medium, and in this regard, it is possible to entrance efficiency of the axial flow rotating machine according to the axial flow rotating machine in the aspect.

In order to achieve the aforementioned objective, an axial flow rotating machine according to the second embodiment is adapted such that the inner shroud has a downstream-side end surface that is directed to the axially downstream side and faces the downstream-side groove side surface in the axial flow rotating machine according to the first aspect. In this case, the downstream-side end surface includes an inclined surface that is gradually directed to the axially downstream side ward the radially outer side.

In the axial flow rotating machine according to the aspect, a part of the leaking medium flowing to the radially outer side between the inner shroud and the downstream-side groove side surface of the annular groove inside the annular groove meets the inclined surface and flows along the inclined surface. The leaking medium flowing along the inclined surface is gradually directed to the axially downstream side toward the radially outer side. Therefore, it is possible to reduce a flow rate component in the radial direction among flow rate components of the leaking medium according to the axial flow rotating medium in the aspect.

In an axial flow rotating machine according to a third aspect of the invention for achieving the aforementioned objective, the inclined surface is present at a direction of 170° with respect to the medium flow modification surface from an end of the medium flow modification surface on the radially outer side in the axial flow rotating machine according to the second aspect.

A flowing direction of the leaking medium at a position of the end of the medium flow modification surface on the radially outer side is a direction with an angle of about 170° with respect to the medium flow modification surface. Therefore, it is possible to allow a large part of the leaking medium that has flowed to the radially outer side along the medium flow modification surface to flow along the inclined surface in the axial flow rotating machine according to the aspect. Therefore, it is possible to enhance an effect of the inclined surface in the axial flow rotating machine according to the aspect.

An axial flow rotting machine according to a fourth aspect of the invention for achieving the aforementioned aspect include; a rotor that is configured to rotate about an axial line; a casing that covers an outer circumferential side of the rotor; a plurality of vanes that are provided inside the casing and are aligned in a circumferential direction with respect to the axial line; and a medium flow modification member that has a medium flow modification surface extending in a radial direction with respect to the axial line. The casing has a medium inlet port that guides a working medium into the casing and a medium outlet port that is located on an axially downstream side that is a downstream side in an axial line direction, in which the axial line extends, beyond the medium inlet port. The rotor has, around the axial line, a rotor shaft that is elongated in an axial line direction, in which the axial line extends, and a plurality of blades that are aligned h the circumferential direction and are secured to the rotor shaft. Both the plurality of vanes and the plurality of blades are disposed between the medium inlet port and the medium outlet port the axial line direction. The plurality of blades are disposed on the axially downstream side beyond the plurality of vanes. Each of the vanes has a vane body that extends in the radial direction and has a vane shape, an inner shroud that is provided on a radially inner side with respect to the axial line of the vane body, and one or more seal this that are provided on the radially inner side of the inner shroud. An annular groove, which is recessed toward the radially inner side and has an annular shape around the axial line, in which the inner shroud and the one or more seal fins are placed in a non-contact manner, is formed at the rotor shaft. The annular groove has a groove bottom surface that is directed to the radially outer side with respect to the axial line and a downstream-side groove side surface that spreads from an end of the groove bottom surface on the axially downstream side toward the radially outer side. The medium flow modification surface is directed to an axially upstream side that is a side opposite to the axially downstream side in the axial line direction and spreads from the groove bottom surface toward the radially outer side. The inner shroud has a downstream-side end surface that is directed to the axially downstream side and faces the downstream-side groove side surface. The downstream-side end surface includes an inclined surface that is gradually directed to the axially downstream side toward the radially outer side. The medium flow modification surface is located on the axially upstream side beyond the downstream-side groove side surface and on the axially downstream side beyond the most-downstream seal fin on the furthest axially downstream side in the one or more seal fins. The inclined surface is present at a direction of 170° with respect to the medium flow modification surface from an end of the medium flow modification surface on the radially outer side.

Since the medium flow modification member is included, and the one or more seal fins are provided at the inner shroud in the axial flow rotating machine according to the aspect as well similarly to the axial flow rotating machine according to the first aspect, it is possible to curb a secondary flow loss and to enhance efficiency of the axial flow rotating machine similarly to the first aspect. Further, since the one or more seal fins are provided at the inner shroud in the axial flow rotating machine according to the aspect as well, it is also possible to curb the amount of flowing leaking medium and to enhance efficiency of the axial flow rotating machine in regard to this point.

Further, in the axial flow rotating machine according to the aspect, a part of a leaking medium that flows to the radially outer side between the inner shroud and the downstream-side groove side surface of the annular groove meets the inclined surface and flows along the inclined surface in the annular groove. The leaking medium that flows along the inclined surface is gradually directed to the axially downstream side toward the radially outer side. Therefore, it is possible to reduce a flow rate component in the radial direction among flow rate components of the leaking medium in the axial flow rotating machine according to the aspect.

A flowing direction of the leaking medium at a position of an end of the medium flow modification surface on the radially outer side is a direction at an angle of about 170° with respect to the medium flow modification surface. Therefore, it is possible to allow a large part of the leaking medium that has flowed to the radially outer side along the medium flow modification surface to flow along the inclined surface in the axial flow rotating machine according to the aspect. Therefore, it is possible to enhance an effect of the inclined surface in the axial flow rotating machine according to the aspect.

An axial flow rotating machine according to a fifth aspect of the invention for achieving the aforementioned objective is adapted such that the inner shroud has a shroud main body that includes the vane body provided on the radially outer side and a seal ring that is secured to the shroud main body in the radially inner side and includes the one or more seal fins provided on the radially inner side, in the axial flow rotating machine according to any one of the second to fourth aspects. In this case, the seal ring has the inclined surface.

An axial flow rotating machine according to a sixth aspect of the invention for achieving the aforementioned objective is adapted such that the inner shroud has a gas path surface that is directed to the radially outer side and includes the vane body formed therein, in the axial flow rotating machine according to any one of the second to fourth aspects. In this case, the inclined surface is present at least within a range from the gas path surface of the inner shroud to a position at a half distance of a thickness of the inner shroud in the radial direction toward the radially inner side.

In the axial flow rotating machine according to the aspect, a part of the leaking medium flowing to the radially outer side between the inner shroud and the downstream-side groove side surface of the annular groove is caused to follow the inclined surface at a position that is close to the cavity outlet port in the radial direction in the annular groove. Therefore, it is possible to reduce a flow rate component in the radial direction among flow rate components of the leaking medium at the cavity outlet port in the axial flow rotating machine according to the aspect.

An axial flow rotating machine according to a seventh aspect of the invention for achieving the object is adapted such that an end of the inclined surface in the radially inner side is located within a range from the gas path surface of the inner shroud to a position of a half distance of a thickness of the inner shroud in the radial direction toward the radially inner side, in the axial flow rotating machine according to the sixth aspect.

The position of the end of the inclined surface on the radially inner side may be restricted by a positional relationship with the most-downstream seal fin in the axial line direction. In this case, if this end is located on the radially outer side, the inclination direction of the inclined surface approaches an orientation of the axial line direction. If the inclination direction of the inclined surface approaches the orientation of the axial line direction, the flow rate component in the radial direction among the flow rate components of the leaking medium flowing along the inclined surface decreases. Therefore, it is possible to reduce the flow rate component of the leaking medium in the radial direction at the cavity outlet portion as compared with a case in which the end is positioned on the radially miner side in the axial flow rotating machine according to the aspect.

An axial flow rotating machine according to an eighth aspect of the invention for achieving the aforementioned objective is adapted such that the medium flow modification surface is located within a range, in which the inclined surface is present, in the axial line direction, in the axial flow rotating machine according to any one of the second to seventh aspects.

In the axial flow rotating machine according to the aspect, a distance Lf from the most-downstream seal fin to the medium flow modification surface in the axial line direction becomes short. Therefore, it is possible to cause the position of the leaking medium, which flows to the radially outer side along the medium flow modification surface, in the axial line direction to be located further on the axially upstream side. Further, in the axial flow rotating machine according to the aspect, it is possible to guide a large amount of leaking medium, which has flowed to the radially outer side along the medium flow modification surface, to the inclined surface. Therefore, flow rate distribution in regard to a flow of the leaking medium at the cavity outlet port in the radial direction is more uniformized, and the maximum flow rate in the radial direction also decreases.

An axial flow rotating machine according to a ninth aspect of the invention for achieving the aforementioned objective is adapted such that a modification surface height that is a distance from the groove bottom surface to an end of the medium flow modification surface on the radially outer side in the radial direction is lower than an inclined surface height that is a distance from the groove bottom surface to an end of the inclined surface on the radially inner side in the radial direction, in the axial flow rotating machine according to any one of the second to eighth aspects.

It is necessary to avoid contact between the downstream-side end surface of the inner shroud and the medium flow modification member even if the vanes secured to the casing move relative to the rotor due to a difference in thermal expansion between the casing and the rotor.

In the axial flow rotating machine according to the aspect, an end of the inclined surface on the radially inner side is located further on the axially upstream side beyond an end of the inner shroud on the furthest axially downstream side. Therefore, the distance from the medium flow modification surface to the end of the inclined surface on the radially inner side in the axial line direction is loner than the distance from the medium flow modification surface to the end of the inner shroud on the furthest axially downstream side in the axial line direction. Therefore, in the axial flow rotating machine according to the aspect, it is possible to avoid contact between the downstream-side end surface of the inner shroud and the medium flow modification member even if the vanes move relative to the rotor due to the difference in thermal expansion between the casing and the rotor.

An axial flow rotating machine according to a tenth aspect of the invention for achieving the aforementioned objective is adapted such that an imaginary extension line directed from the inclined surface toward the radially outer side and toward the axially downstream side does not intersect the downstream-side groove side surface in the axial flow rotating machine according to any one of the second to ninth aspects.

In the axial flow rotating machine according to the aspect, it is possible to reduce the amount of the leaking medium, which has flowed along the inclined surface, meeting the downstream-side groove side surface.

An axial flow rotating machine according to an eleventh aspect for achieving the aforementioned aspect is adapted such that the shortest distance from an end of the medium flow modification surface on the radially outer side to the inner shroud is equal to or less than the distance L, in the axial flow rotating machine according to any one of the first to tenth aspects.

A portion between the end of the medium flow modification surface on the radially outer side and the portion of the inner shroud located at the shortest distance position from the end is assumed to be an inlet port of the downstream-side flow path in the cavity, and the outlet port of the cavity downstream-side flow path is assumed to be a cavity outlet port. In the axial flow rotating machine according to the aspect, the shortest distance from the end of the medium flow modification surface on the radially outer side to the inner shroud is equal to or less than the distance L. Therefore, the downstream-side flow path in the cavity of the axial flow rotating machine according to the aspect is an expanded flow path with a large opening area of the outlet port as compared with an opening area of the inlet port. Further, in the axial flow rotating machine according to the aspect, the outlet port of the downstream-side flow path in the cavity is located further on the axially downstream side beyond the inlet port of the downstream-side flow path in the cavity. Therefore, in the axial flow rotating machine according to the aspect, it is possible to increase a component in the axial line direction and reduce a component in the radial direction among speed components of the leaking medium leaking out from the outlet port of the downstream-side flow path in the cavity, that is, from the cavity outlet port.

An axial flow rotating machine according to a twelfth aspect for achieving the aforementioned objective is adapted such that the distance Lf is a distance of equal to or greater than 0.5 times the distance L, in the axial flow rotating machine according to any one of the first to eleventh aspects.

In the axial flow rotating machine according to the aspect, it is possible to avoid contact between the downstream-side end surface of the inner shroud and the medium flow modification member even if the vanes move relative to the rotor due to the difference in thermal expansion between the casing and the rotor.

An axial flow rotating machine according to a thirteenth aspect of the invention for achieving the aforementioned objective, a modification surface height that is a distance from the groove bottom surface to an end of the medium flow modification surface on the radially outer side in the radial direction is equal to or less than a seal surface height that is a distance from the groove bottom surface to an end of the inner shroud on the radially inner side in the radial direction, in the axial flow rotating machine according to any one of the first to twelfth aspects.

In the axial flow rotating machine according to the aspect, it is possible to more reliably avoid contact between the downstream-side end surface of the inner shroud and the medium flow modification member even if the vanes move relative to the rotor due to a difference in thermal expansion between the casing and the rotor.

An axial flow rotating machine according to a fourteenth aspect of the invention for achieving the aforementioned objective is adapted such that a modification surface height that is a distance from the groove bottom surface to an end of the medium flow modification surface on the radially outer side in the radial direction is equal to or less than a fin height that is a length of the one or more seal fins in the radial direction, in the axial flow rotating machine according to any one of the first to twelfth aspects.

In the axial flow rotating machine according to the aspect, it is possible to more reliably contact between the downstream-side end surface of the inner shroud and the medium flow modification member even if the vanes move relative to the rotor due to a difference in thermal expansion between the casing and the rotor.

Here, in the axial flow rotating machine according to any one of the first to fourteenth aspects, the casing may be a steam turbine casing, and the steam turbine casing may have a steam inlet port that serves as the medium inlet port that guides steam as the working medium into the steam turbine casing and a steam outlet port that serves as the medium outlet pore. That is, the axial flow rotating machine may be a steam turbine.

In addition, in the axial flow rotating machine according to any one of the first to fourteenth aspects, the casing may be a gas turbine casing, and the gas turbine casing may have a combustion gas inlet port that serves as the medium inlet port that guides combustion gas as the working medium into the gas turbine casing and a combustion gas outlet port that serves as the medium outlet port. That is, the axial flow rotating machine may be a gas turbine.

Advantageous Effects of Invention

According to the axial flow rotating machine in an aspect of the invention, it is possible to curb a secondary flow loss and to enhance efficiency of the axial floss rotating machine.

DESCRIPTION OF EMBODIMENTS

Hereinafter, embodiments and modification examples of an axial flow rotating machine according to the invention will be described in detail with reference to the drawings.

First Embodiment

A first embodiment of an axial rotating machine according to the invention will be described with reference to FIGS. 1 to 4.

Figure 1:
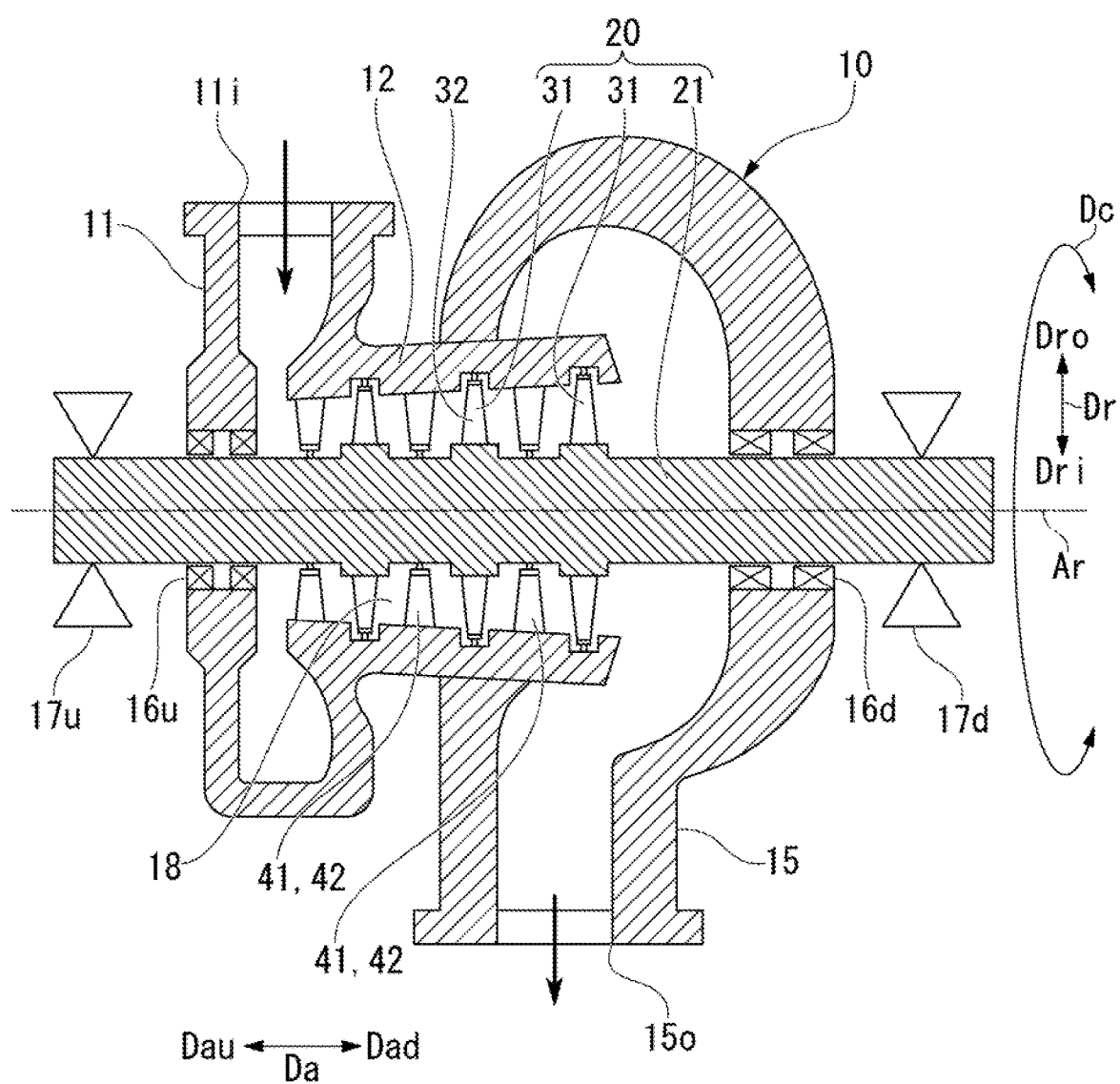
FIG. 1 is an overall sectional view of an axial flow rotating machine according to a first embodiment of the invention.

The axial flow rotating machine according to the first embodiment is a steam turbine. The steam turbine includes, as shown in FIG. 1, a rotor 20 that rotates about an axial line Ar, a steam turbine casing 10 that covers an outer circumferential side of the rotor 20, and a plurality of vane rows 41 that are secured to the steam turbine casing 10. Also, a direction in which the axial line Ar extends is defined as an axial line direction Da, a circumferential direction around the axial line Ar is defined as a circumferential direction Dc, and a direction that is perpendicular to the axial line Ar is defined as a radial direction Dr below. Further, the side toward the axial line Ar in the radial direction Dr is defined as a radially inner side Dri, and an opposite side thereof is defined as a radially outer side Dro.

The steam turbine casing 10 has an inlet portion 11 into which steam flows from the outside, a body portion 12, and an exhaust portion 15 that discharges steam to the outside. Also, the steam turbine casing will be referred to as casing below. A stem inlet port (medium inlet port) 11i that guides steam, which is a working medium, into the casing is formed at the inlet port 11. The body portion 12 has a substantially tubular shape around the axial line Ar. A steam outlet port (medium outlet port) 15o that discharges steam to the outside is formed at the exhaust portion 15. The inlet portion 11, the body portion 12, and the exhaust portion 15 are aligned in this order in the axial line direction Da. Also, a side on which the inlet portion 11 is present relative to the exhaust portion 15 in the axial line direction Da is defined as an axially upstream side Dau, and the opposite side is defined as an axially downstream side Dad.

The rotor 20 has a rotor shaft 21 that extends around the axial line Ar in the axial line direction Da and a plurality of blade rows 31 that are attached to the rotor shaft 21. The plurality of blade rows 31 are aligned in the axial line direction Da and are disposed on the radially inner side Dri of the tubular body portion 12. Each of the blade rows 31 is configured to include the plurality of blades 32 aligned in the circumferential direction Dc.

The plurality of vane rows 41 are aligned in the axial line direction Da. Each of the vane rows 41 is disposed on the axially upstream side Dau of any one blade row 31 of the plurality of blade rows 31. Each of the vane rows 41 is configured to include a plurality of vanes 42 aligned in the circumferential direction Dc. Each of the vanes 42 is disposed on the radially inner side Dri of the tubular body portion 12 and is secured to the body portion 12.

An end of the rotor shaft 21 on the axially upstream side Dau projects from the inside of the casing 10 on the axially upstream side Dau. Also, an end of the rotor shaft 21 on the axially downstream side Dad projects from the inside of the casing 10 on the axially downstream side Dad. An upstream-side shaft seal 16u is provided at a portion at which the rotor shaft 21 penetrates to the outside at the inlet portion 11 of the casing 10. Also, a downstream-side shaft seal 16d is provided at a portion at which the rotor shaft 21 penetrates to the outside at the exhaust portion 15 of the casing 10. A portion of the rotor shaft 21 on the axially upstream side Dau beyond the upstream-side shaft seal 16u is supported by an upstream-side bearing 17u. Also, a portion of the rotor shaft 21 on the axially downstream side Dad beyond the downstream-side shaft seal 16d is supported by a downstream-side bearing 17d. The rotor 20 is supported by the upstream-side bearing 17u and the downstream-side bearing such that the rotor 20 can rotate about the axial line Ar.

Figure 2:
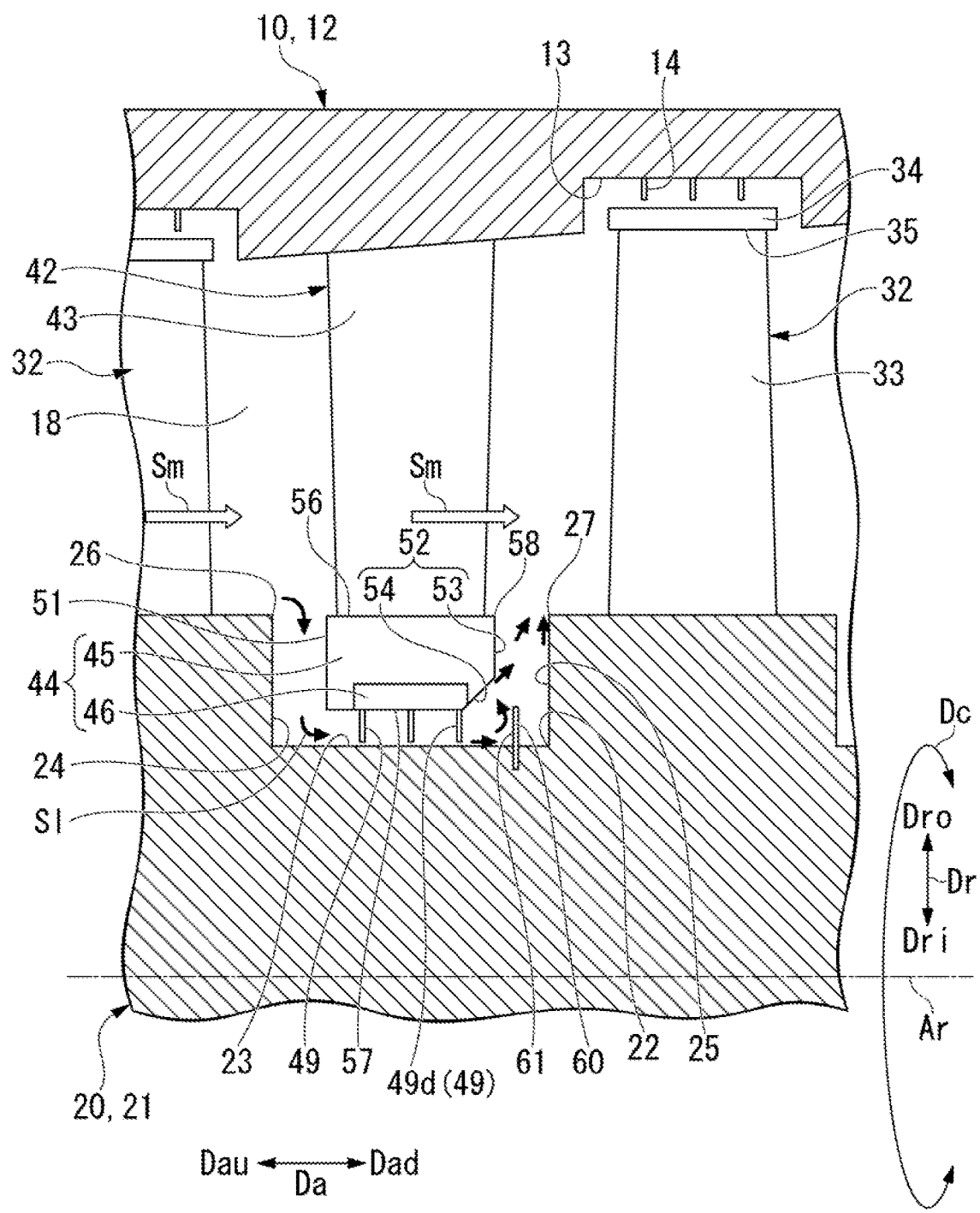
FIG. 2 is a main part sectional view of the axial flow rotating machine according to the first embodiment of the invention.

Each blade 32 has, as shown in FIG. 2, a blade body 33 that has a blade shape and extends in the radial direction Dr and an outer shroud 34 that is provided on the radially outer side Dro of the blade body 33. The blade body 33 is secured to the rotor shaft 21. A surface of the outer shroud 34 on the radially inner side Dri forms a gas path surface 35. In addition, although the blade 32 shown here as an example has the outer shroud 34, the outer shroud 34 may be omitted in some cases.

An outer annular groove 13 is formed at a portion of the body portion 12 of the casing 10 which faces the outer shroud 34 of the blade 32 in the radial direction Dr. The outer annular groove 13 is recessed toward the radially outer side Dro and has an annular shape around the axial line Ar. The outer shroud 34 of the blade 32 is disposed in the outer annular groove 13. A plurality of seal fins 14 that extend from a groove bottom surface of the outer annular groove 13 to the radially inner side Dri are provided on the groove bottom surface. The outer shroud 34 of the blade 32 is disposed in the outer annular groove 13 in a non-contact state with the outer annular groove 13 and the plurality of seal fins 14.

Each vane 42 has a vane body 43 that has a vane shape and extends in the radial direction Dr, an inner shroud 44 that is provided on the radially inner side Dri of the vane body 43, and a plurality of seal fins 49 that are provided on the radially inner side Dri of the inner shroud 44. The inner shroud 44 has a shroud main body 45 and a seal ring 46 that is secured to the shroud main body 45 on the radially inner side Dri. The vane 42 is disposed on the radially inner side Dri of the tubular body portion 12 and is secured to the body portion 12 as described above. The plurality of seal fins 49 extending from the seal ring 46 to the radially inner side Dri are provided on the radially inner side Dri of the seal ring 46. The plurality of seal fins 49 are aligned in the axial line direction Da.

An inner annular groove 22 is formed at a portion of the rotor shaft 21 that faces the inner shroud 44 of the vane 42 in the radial direction Dr. The inner annular groove (hereinafter, referred to as an annular groove) 22 is recessed toward the radially inner side Dri and has an annular shape around the axial line Ar. The inner shroud 44 and the plurality of seal fins 49 are disposed in the annular groove 22 in a non-contact state with the annular groove 22. A portion of the opening of the annular groove 22 on the axially upstream side Dau beyond the inner shroud 44 forms a cavity inlet port 26. Also, a portion of the opening of the annular groove 22 on the axially downstream side Dad beyond the inner shroud 44 forms a cavity outlet port 27.

The annular groove 22 has a groove bottom surface 23 that is directed to the radially outer side Dro, an upstream-side groove side surface 24 that spreads from an end of the groove bottom surface 23 on the axially upstream side Dau toward the radially outer side Dro, and a downstream-side groove side surface 25 that spreads from an end of the groove bottom surface 23 on the axially downstream side Dad toward the radially outer side Dro. The upstream-side groove side surface 24 and the downstream-side groove side surface 25 face each other in the axial line direction Da.

The steam turbine according to the embodiment further includes a medium flow modification member 60. The medium flow modification member 60 has a plate shape, a part thereof is incorporated in the rotor shaft 21, and a remaining portion projects from the rotor shaft 21 toward the radially outer side Dro. The medium flow modification member 60 has a medium flow modification surface 61. The medium flow modification surface 61 is directed to the axially upstream side Dau and spreads from the groove bottom surface 23 toward the radially outer side Dro. The medium flow modification surface 61 is located on the axially upstream side Dau beyond the downstream-side groove side surface 25 of the annular groove 22 and on the axially downstream side Dad beyond the most-downstream seal fin 49d on the furthest axially downstream side Dad among the plurality of seal fins 49.

The inner shroud 44 has an upstream-side end surface 51 that is directed to the axially upstream side Dau and faces the upstream-side groove side surface 24, a downstream-side end surface 52 that is directed to the axially downstream side Dad and faces the downstream-side groove side surface 25, a gas path surface 56 that is directed to the radially outer side Dro, and a seal surface 57 that is directed to the radially inner side Dri. The upstream-side end surface 51 and the downstream-side end surface 52 are in a back-to-back relationship in the axial line direction Da. The vane body 43 is formed on the gas path surface 56. The gas path surface 56 and the seal surface 57 are in a back-to-back relationship in the radial direction Dr. The downstream-side end surface 52 includes a parallel surface 53 that is substantially parallel to the downstream-side groove side surface 25 and an inclined surface 54 that is inclined with respect to the downstream-side groove side surface 25. The parallel surface 53 forms a surface of the downstream-side end surface 52 on the radially outer side Dro. The inclined surface 54 is a surface that is gradually directed to the axially downstream side Dad toward the radially outer side Dro. The inclined surface 54 forms a surface of the downstream-side end surface 52 on the radially inner side Dri. The inclined surface 54 is formed over the shroud main body 45 of the inner shroud 44 and the seal ring 46 of the inner shroud 44.

A space in which each of the blade bodies 33 of the plurality of blades 32 and each of the vane bodies 43 of the plurality of vanes 42 are present is a space that has an annular shape around the axial line Ar. The annular space forms the medium main flow path 18 through which steam that is a working medium flows. The medium main flow path 18 is defined by the gas path surface 56 of the inner shroud 44 of each vane 42, a portion of an inner circumferential surface of the casing 10 which faces the inner shroud 44 in the radial direction Dr, a portion of an outer circumferential surface of the rotor shaft 21 to which each blade 32 is secured, and the gas path surface 35 of the outer shroud 34 of each blade 32.

Next, the position of the medium flow modification surface 61 in the axial line direction Da and the height thereof in the radial direction Dr will be described with reference to FIG. 3.

Here, a distance from an end 58 of the inner shroud 44 on the furthest axially downstream side Dad to the downstream-side groove side surface 25 in the axial line direction Da is defined as a distance L. In this case, a distance Lf from the most-downstream seal fin 49d to the medium flow modification surface 61 in the axial line direction Da is equal to or less than the distance L and equal to or greater than a distance (0.5×L). That is, the relationship between the distance L and the distance Lf is as follows:

$$0.5 \times L \leq Lf \leq L$$

where the medium flow modification surface 61 is located further on the axially downstream side Dad beyond the end 58 of the inner shroud 44 on the furthest axially downstream side Dad in the embodiment.

Also, a relationship between a modification surface height He that is the distance from the groove bottom surface 23 to an end 62 of the medium flow modification surface 61 on the radially outer side Dro and other heights and the like are as follows:

$$Hg < (Hg + Hh) = Hp < He$$

Figure 4:
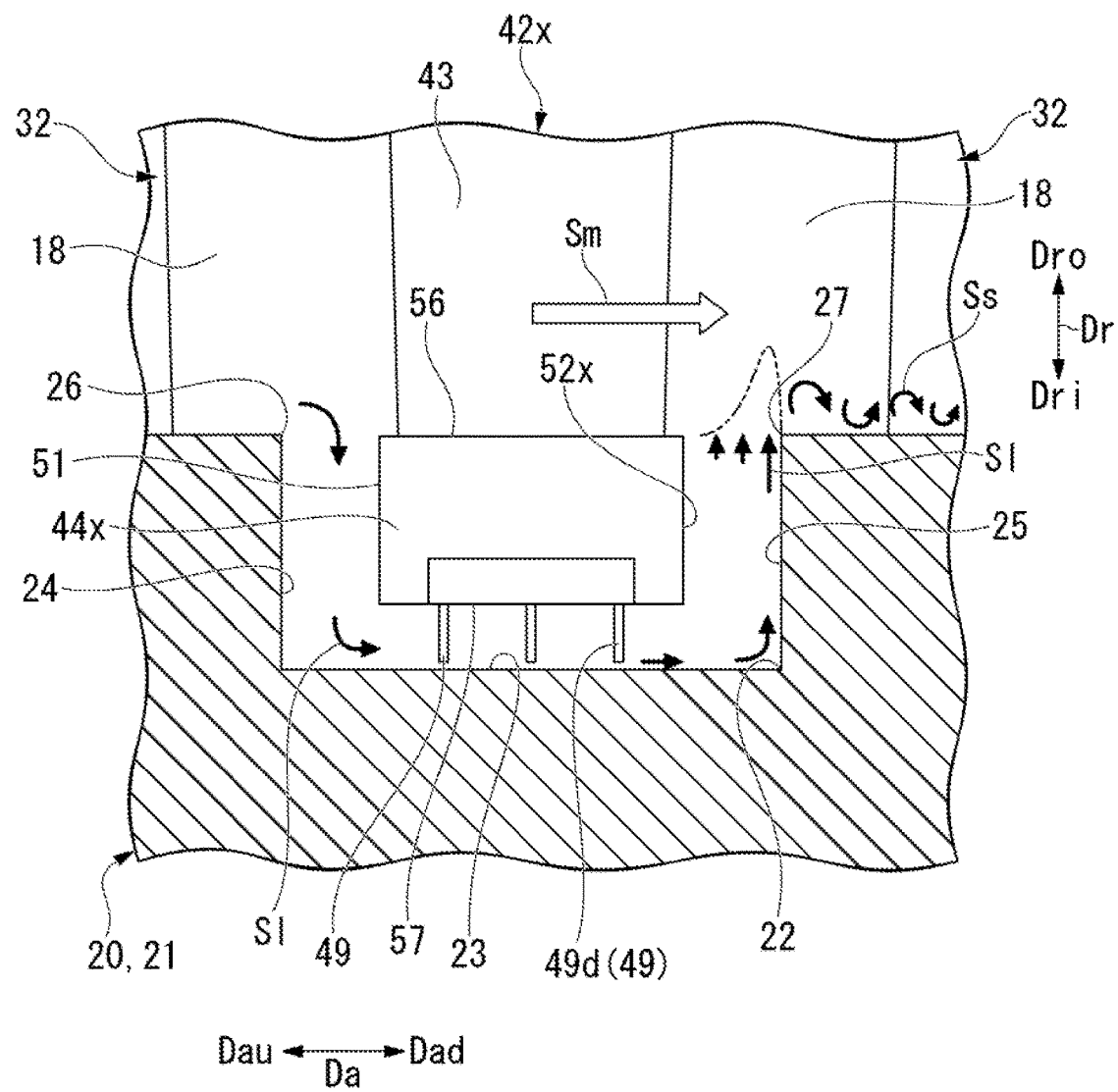
FIG. 4 is a sectional view around an inner annular groove and an inner shroud in an axial flow rotating machine according to a comparative example.

Hg: a seal gap that is a distance from the groove bottom surface 23 to the end of the seal fin 49 on the radially inner side Dri in the radial direction Dr Hf: the fin height that is a length of the seal tin 49 in the radial direction Dr Hp: the seal surface height that is a distance from the groove bottom surface 23 to the seal surface 57 of the inner shroud 44 in the radial direction Dr Next, a steam turbine according to a comparative example will be described with reference to FIG. 4 before explaining advantages of a steam turbine according to the embodiment.

The steam turbine according to the comparative example also has a rotor 20 and a plurality of vanes 42x similarly to the steam turbine according to the embodiment. The rotor 20 is completely the same as the rotor 20 according to the embodiment. Each vane 42x has a vane body 43, an inner shroud 44x, and a plurality of seal fins 49 similarly to the vane 42 in the embodiment. The inner shroud 44x has an upstream-side end surface 51, a downstream-side end surface 52x, a gas path surface 56, and a seal surface 57 similarly to the inner shroud 44 according to the embodiment. However, the downstream-side end surface 52x does not include the inclined surface 54 according to the embodiment. That is, the entire downstream-side end surface 52x is a parallel surface that is substantially parallel to the downstream-side groove side surface 25. Also, the steam turbine according to the comparative example does not have the medium flow modification member 60 of the steam turbine according to the embodiment.

In the steam turbine according to the comparative example, some of main steam Sm that flows through the medium main flow path 18 flows into the annular groove 22 as leaking steam S1 from the cavity inlet port 26. The leaking steam S1 flows toward the axially downstream side Dad between the seal surface 57 of the inner shroud 44x and the groove bottom surface 23 of the annular groove 22. However, since the plurality of seal fins 49 are present between the seal surface 57 of the inner shroud 44x and the groove bottom surface 23 of the annular groove 22, the amount of flowing leaking steam S1 passing between the seal surface 57 of the inner shroud 44x and the groove bottom surface 23 of the annular groove 22 is curbed. The leaking steam S1 that has passed through the plurality of seal fins 49 flows mainly to the radially outer side Dro between the downstream-side end surface 52x of the inner shroud 44x and the downstream-side groove side surface 25 of the annular groove 22. Then, the leaking steam S1 returns from the cavity outlet port 27 into the medium main flow path 18.

The leaking steam S1 flows into main steam Sm that flows to the axially downstream side Dad in the medium main flow path 18. As a result, a secondary flow Ss that is a complicated flow is generated on the downstream side beyond a portion at which the main steam Sm and the leaking steam S1 are mixed. If the secondary flow Ss is generated in the medium main flow path 18, efficiency of the steam turbine is degraded.

The leaking steam S1 that has passed between the end of the most-downstream seal fin 49d on the radially inner side Dri among the plurality of seal fins 49 and the groove bottom surface 23 of the annular groove 22 mainly flows to the axially downstream side Dad along the groove bottom surface 23. If the leaking steam S1 meets the downstream-side groove side surface 25, the leaking steam S1 mainly flows substantially to the radially outer side Dro along the downstream-side groove side surface 25. Therefore, in the leaking steam S1 that flows to the radially outer side Dro along the downstream-side groove side surface 25 in the leaking steam S1 that flows between the downstream-side end surface 52x of the inner shroud 44x and the downstream-side groove side surface 25 of the annular groove 22, a flow rate component in the radial direction Dr becomes larger than that of the leaking steam S1 that flows to the radially outer side Dro at a position separated from the downstream-side groove side surface 25 on the axially upstream side Dau. That is, flow rate distribution in regard to the flow of the leaking steam S1 in the radial direction Dr at the cavity outlet port 27 is as shown by the two-dotted chain line in FIG. 4. As shown in the flow rate distribution, the flow rate in the radial direction Dr at the position that is close to the downstream-side groove side surface 25 in the axial line direction Da is significantly large. Also, the flow rate in the radial direction Dr steeply decreases as the flow rate value deviates from the maximum position to a position on the axially upstream side Dau in the comparative example.

Next, advantages of the steam turbine according to the embodiment will be described with reference to FIG. 3.

Some of the main steam Sm that flows through the medium main flow path 18 also flows into the annular groove 22 from the cavity inlet port 26 as leaking steam S1 in the steam turbine according to the embodiment as well, similarly to the steam turbine according to the comparative example. The leaking steam S1 flows toward the axially downstream side Dad between the seal surface 57 of the inner shroud 44 and the groove bottom surface 23 of the annular groove 22. Since the plurality of seal fins 49 are present between the seal surface 57 of the inner shroud 44 and the groove bottom surface 23 of the annular groove 22 in the embodiment as well, the amount of flowing leaking steam S1 that passes between the seal surface 57 of the inner shroud 44 and the groove bottom surface 23 of the annular groove 22 is curbed.

The leaking steam S1 that has passed between the end of the most-downstream seal fin 49d on the radially inner side Dri among the plurality of seal fins 49 and the groove bottom surface 23 of the annular groove 22 mainly flows to the axially downstream side Dad along the groove bottom surface 23. The flow of the leaking steam S1 described above is the same as the flow of the leaking steam S1 in the steam turbine according to the comparative example.

The leaking steam S1 that passes between the end of the most-downstream seal fin 49d on the radially inner side Dri and the groove bottom surface 23 of the annular groove 22 and flows to the downstream side Dad along the groove bottom surface 23 meets the medium flow modification surface 61 that is present on the axially upstream side Dau beyond the downstream-side groove side surface 25. If the leaking steam S1 meets the medium flow modification surface 61, the leaking steam S1 mainly flows to the substantially radially outer side Dro along the medium flow modification surface 61.

Then, the leaking steam S1 mainly flows to the radially outer side Dro between the downstream-side end surface 52 of the inner shroud 11 and the downstream-side groove side surface 25 of the annular groove 22. Then, the leaking steam S1 returns into the medium main flow path 18 through the cavity outlet port 27.

Since the plurality of seal fins 49 are provided at the inner shroud 44 in the embodiment, the flow of the leaking steam S1 that has passed between the end of the most-downstream seal fin 49d on the radially inner side Dri and the groove bottom surface 23 of the annular groove 22 mainly becomes a flow along the groove bottom surface 23 as described above. Therefore, it is possible to allow a large part of the leaking steam S1 that has passed between the seal surface 57 of the inner shroud 44 and the groove bottom surface 23 of the annular groove 22 to meet the medium flow modification surface 61. Therefore, it is possible to increase the amount of flowing leaking steam S1 that flows substantially to the radially outer side Dro along the medium flow modification surface 61 in the embodiment.

Further, since the distance Lf from the most-downstream seal fin 49d to the medium flow modification surface 61 in the axial line direction Da is equal to or less than the distance L from the end 58 of the inner shroud 44 on the furthest axially downstream side Dad to the downstream-side groove side surface 25 in the axial line direction Da in the embodiment as described above, it is possible to change the main flow of the leaking steam S1 to a flow to the radially outer side Dro at a position on the axially upstream side Dau beyond the downstream-side groove side surface 25.

Therefore, the amount of flowing leaking steam S1 that flows to the radially outer side Dro along the downstream-side groove side surface 25 decreases, and the flow rate of the leaking steam S1 in the radial direction Dr also decreases in the embodiment as compared with those in the comparative example. Meanwhile, the amount of flowing leaking steam S1 that flows to the radially outer side Dro at a position separated from the downstream-side groove side surface 25 on the axially upstream side Dau increases, and the flow rate of the leaking steam S1 in the radial direction Dr also increases in the embodiment as compared with those in the comparative example. That is, flow rate distribution in regard to the flow of the leaking steam S1 in the radial direction Dr at the cavity outlet port 27 is uniformized, and the maximum flow rate in the radial direction Dr also decreases in the embodiment as compared with those in the comparative example.

Further, the inclined surface 54, which is not formed in the comparative example, is formed at the inner shroud 44 in the embodiment. Therefore, at least a part of the leaking steam S1 that has flowed substantially to the radially outer side Dro along the medium flow modification surface 61 meets the inclined surface 54 and flows along the inclined surface 54. The inclined surface 54 is a surface that is gradually directed to the axially downstream side Dad toward the radially outer side Dro as described above. Therefore, the leaking steam S1 flowing along the inclined surface 54 is gradually directed to the axially downstream side Dad toward the radially outer side Dro. Therefore, the flow rate component in the radial direction Dr in the flow rate components of the leaking steam S1 becomes smaller than that in the comparative example. That is, it is possible to reduce the flow rate component in the radial direction Dr in the leaking steam S1 at the cavity outlet port 27 as compared with that in the comparative example using the inclined surface 54 in the embodiment.

Figure 3:
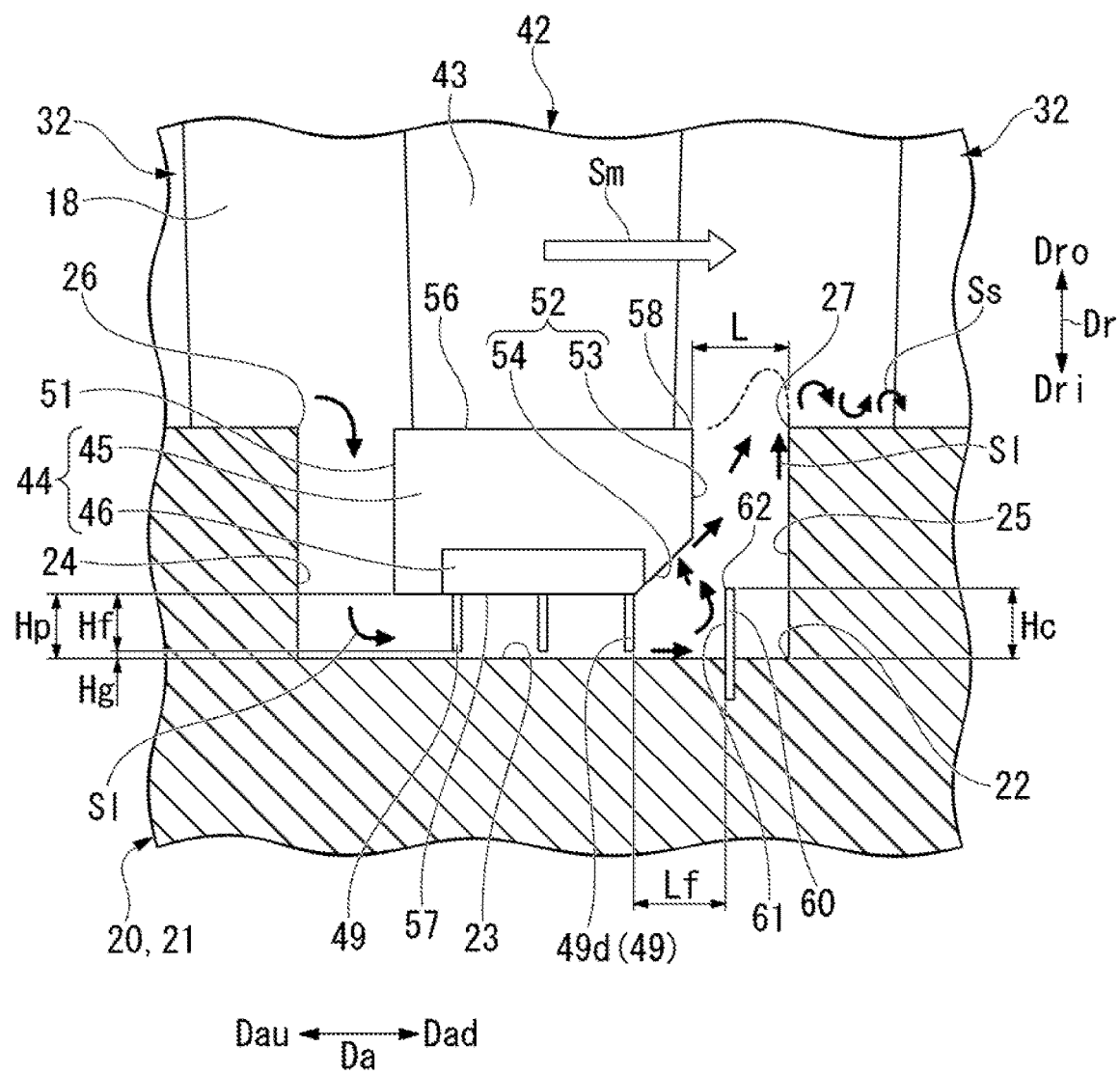
FIG. 3 is a sectional view around an inner annular groove and an inner shroud in the axial flow rotating machine according to the first embodiment of the invention.

As described above, the flow rate distribution in regard to the flow of the leaking steam S1 in the radial direction Dr at the cavity outlet port 27 is uniformized as represented by the two-dotted chain line in FIG. 3, and the maximum flow rate in the radial direction Dr also decreases due to the presence of the medium flow modification surface 61 and the inclined surface 54 in the embodiment as compared with those in the comparative example.

Since the momentum is proportional to a square of the speed, it is possible to curb growth of the secondary flow Ss formed on the axially downstream side Dad beyond the position at which the main steam Sm and the leaking steam S1 are mixed as the flow rate distribution at the cavity outlet port 27 is more uniformized and the maximum flow rate in the radial direction Dr further decreases. Therefore, it is possible to curb the growth of the secondary flow Ss and to curb a secondary flow loss in the embodiment as compared with those in the comparative example.

In the embodiment, it is possible to curb the secondary flow loss and to thereby enhance efficiency of the steam turbine as described above. Further, since the plurality of seal fins 49 are provided at the inner shroud 44, it is possible to curb the amount of flowing leaking steam S1 and to enhance efficiency of the steam turbine in this regard as well in the embodiment.

Incidentally, it is possible to further uniformize the flow rate distribution in regard to the flow of the leaking steam S1 in the radial direction Dr at the cavity outlet port 27 as the modification surface height Hc is higher and the medium flow modification surface 61 is closer to the downstream-side end surface 52 of the inner shroud 44. Meanwhile, it is necessary to avoid contact between the downstream-side end surface 52 of the inner shroud 44 and the medium flow modification member 60 even if the vanes 42 secured to the casing 10 move relative to the rotor 20 due to a difference in thermal expansion between the casing 10 and the rotor 20.

Here, the distance L from the end 58 of the inner shroud 44 on the furthest axially downstream side Dad to the downstream-side groove side surface 25 in the axial line direction Da is set to such a dimension that the inner shroud 44 of the vane 42 and the downstream-side groove side surface 25 of the rotor 20 do not come in contact with each other even if the vanes 42 secured to the casing 10 move on the axially downstream side Dad relative to the rotor 20 to the maximum extent due to a difference in thermal expansion between the casing 10 and the rotor 20.

In the embodiment, since the inclined surface 54 is formed at the portion of the downstream-side end surface 52 of the inner shroud 44 on the radially inner side Dri although the distance Lf from the most-downstream seal fin 49d to the medium flow modification surface 61 in the axial line direction Da is shorter than the distance L, a portion of the downstream-side end surface 52 of the inner shroud 44 on the radially inner side Dri beyond the end 58 of the inner shroud 44 on the furthest axially downstream side Dad escapes to the axially upstream side Dau. Further, the distance Lf from the most-downstream seal fin 49d to the medium flow modification surface 61 in the axial line direction Da is equal to or greater than the distance (0.5×L) in the embodiment. Therefore, it is possible to avoid contact between the downstream-side end surface 52 of the inner shroud 44 and the medium flow modification member 60 even if the vanes 42 move relative to the rotor 20 due to a difference in thermal expansion between the casing 10 and the rotor 20 in the embodiment.

Also, although the downstream-side end surface 52 of the inner shroud 41 includes the inclined surface 54 in the embodiment, the inclined surface 54 may not be included. In this case, it is not possible to obtain the effect of the inclined surface 54, but it is possible to reduce manufacturing costs of the inner shroud 44. Therefore, in a case in which the downstream-side end surface 52 of the inner shroud 44 does not include the inclined surface 54, it is possible to uniformize the flow rate distribution in regard to the flow of the leaking steam S1 in the radial direction Dr at the cavity outlet port 27 using the plurality of seal fins 49 provided at the inner shroud 44 and the medium flow modification member 60, but the effect of uniformizing the flow rate distribution is lower than that of the embodiment.

Second Embodiment

Figure 5:
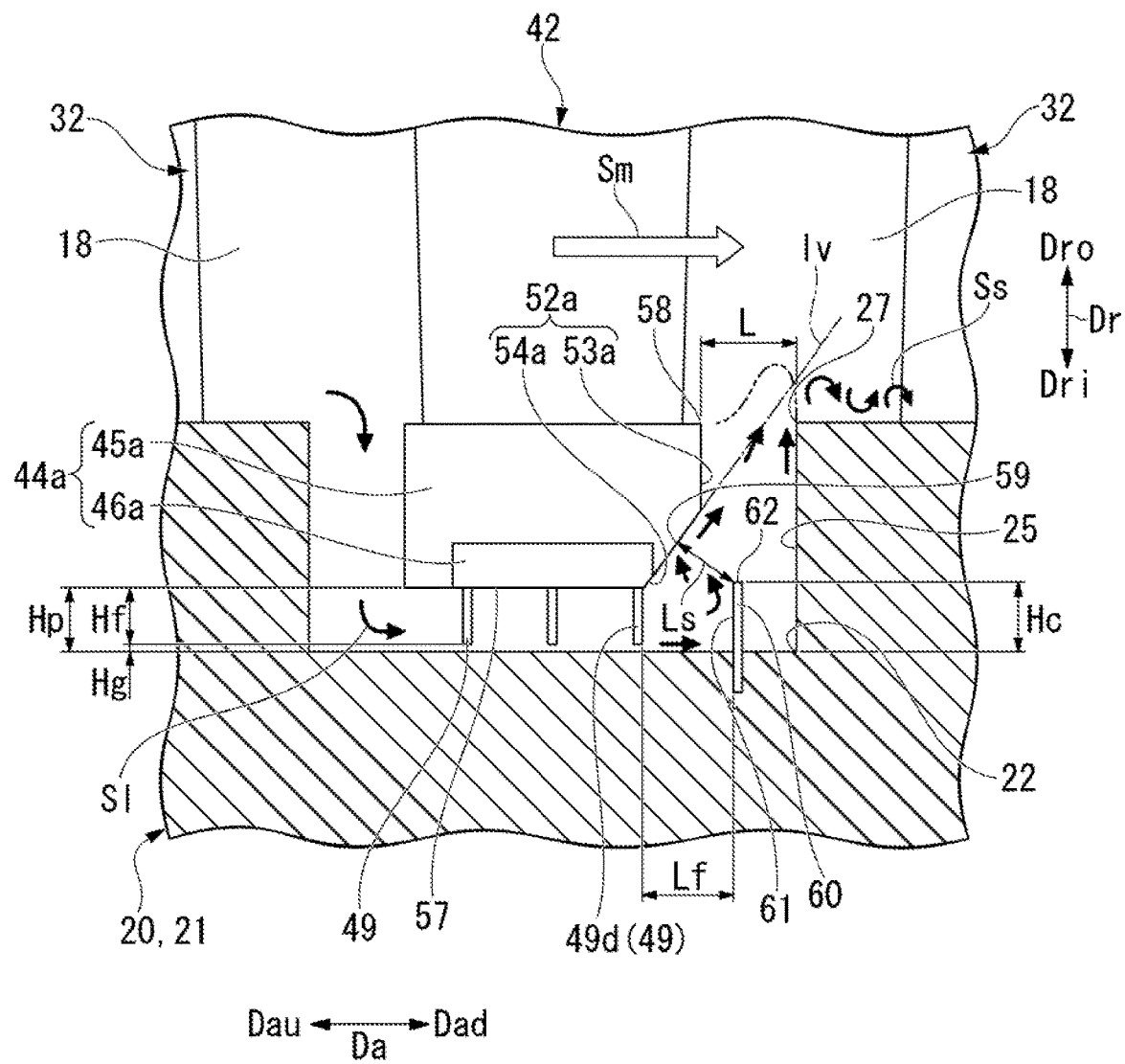
FIG. 5 is a sectional view around an inner annular groove and an inner shroud in an axial flow rotating machine according to a second embodiment of the invention.

A second embodiment of an axial flow rotating machine according to the invention will be described with reference to FIG. 5.

The axial flow rotating machine according to the embodiment is also a steam turbine similarly to the first embodiment. The angle and the like of the inclined surface 54 in the steam turbine according to the first embodiment is changed in the steam turbine according to the embodiment, the other configurations thereof are basically the same as the configurations in the steam turbine according to the first embodiment.

A downstream-side end surface 52a of an inner shroud 44a in the embodiment also includes a parallel surface 53a that is substantially parallel to the downstream-side groove side surface 25 and an inclined surface 54a that is inclined with respect to the downstream-side groove side surface 25 similarly to the downstream-side end surface 52 in the first embodiment. The parallel surface 53a forms a surface of the downstream-side end surface 52a on the radially outer side Dro. The inclined surface 54a is a surface that is gradually directed to the axially downstream side Dad toward the radially outer side Dro. The inclined surface 54a forms a surface of the downstream-side end surface 52a on the radially inner side Dri. The inclined surface 54a is formed over a shroud main body 45a of the inner shroud 44a and a seal ring 46a of the inner shroud 44a.

An imaginary extension line lv that is an imaginary extension line in regard to the inclined surface 54a in the embodiment and that is directed from the inclined surface 54a toward the radially outer side Dro and toward the axially downstream side Dad does not intersect the downstream-side groove side surface 25. In other words, the imaginary extension line lv intersects the imaginary extension line extending from the downstream-side groove side surface 25 to the radially outer side Dro.

Also, a shortest distance Ls from the end 62 of the medium flow modification surface 61 on the radially outer side Dro to the inner shroud 44a is equal to or less than the distance L from the end 58 of the inner shroud 44a on the furthest axially downstream side Dad to the downstream-side groove side surface 25 in the axial line direction Da in the embodiment. That is, the relationship between the distance L and the distance Ls is as follows:

$$Ls \leq L$$

Also, all the distance L, the distance Lf, the modification surface height Hc, the seal gap Hg, the fin height Hf, and the seal surface height Hp in the embodiment are the same as the corresponding dimensions in the first embodiment.

As described above, at least a part of the leaking steam S1 that has flowed substantially to the radially outer side Dro along the medium flow modification surface 61 meets the inclined surface 54a and flows along the inclined surface 54a in the embodiment as well. The leaking steam S1 that flows along the inclined surface 54a is gradually directed to the axially downstream side Dad toward the radially outer side Dro.

It is assumed that the imaginary extension line lv in regard to the inclined surface intersects the downstream-side groove side surface 25. In this case, a part of the leaking steam S1 that has flowed along the inclined surface meets the downstream-side groove side surface 25. If the part of the leaking steam S1 meets the downstream-side groove side surface 25, the leaking steam S1 flows to the radially outer side Dro along the downstream-side groove side surface 25. Therefore, in this case, the flow rate of the leaking steam S1 flowing in the radial direction Dr at the position of the cavity outlet port 27 in the radial direction Dr and at a position that is close to the downstream-side groove side surface 25 in the axial line direction Da increases, and the amount of flowing leaking steam S1 increases. Therefore, the effect of the inclined surface is degraded in this case. Therefore, it is preferable to enhance the effect of the inclined surface 54a by not allowing the imaginary extension line lv of the inclined surface 54a to intersect the downstream-side groove side surface 25 as in the embodiment.

Here, a portion between the end 62 of the medium flow modification surface 61 on the radially outer side Dro and a portion 59 of the inner shroud 44a at a position at the shortest distance Ls from the end 62 is assumed to be an inlet port of the downstream-side flow path in the cavity. Further, the outlet port of the cavity downstream-side flow path is assumed to be a cavity outlet port 27. In the embodiment, the shortest distance Ls from the end 62 of the medium flow modification surface 61 on the radially outer side Dro to the inner shroud 44a is equal to or less than the distance L as described above. Therefore, the downstream-side flow path in the cavity in the embodiment an extension flow path with a larger opening area of the outlet port than the opening area of the inlet port. Further, the outlet port of the downstream-side flow path in the cavity is located on the axially downstream side Dad beyond the inlet port of the downstream-side flow path in the cavity in the embodiment. Therefore, it is possible to increase the component in the axial line direction Da and to reduce the component in the radial direction Dr among the speed components of the leaking steam S1 flowing out of the outlet port of the downstream-side flow path in the cavity, that is, from the cavity outlet port 27. Therefore, it is possible to curb growth of the secondary flow Ss formed on the axially downstream side Dad beyond a position at which the main steam Sm and the leaking steam S1 are mixed in the embodiment.

Third Embodiment

Figure 6:
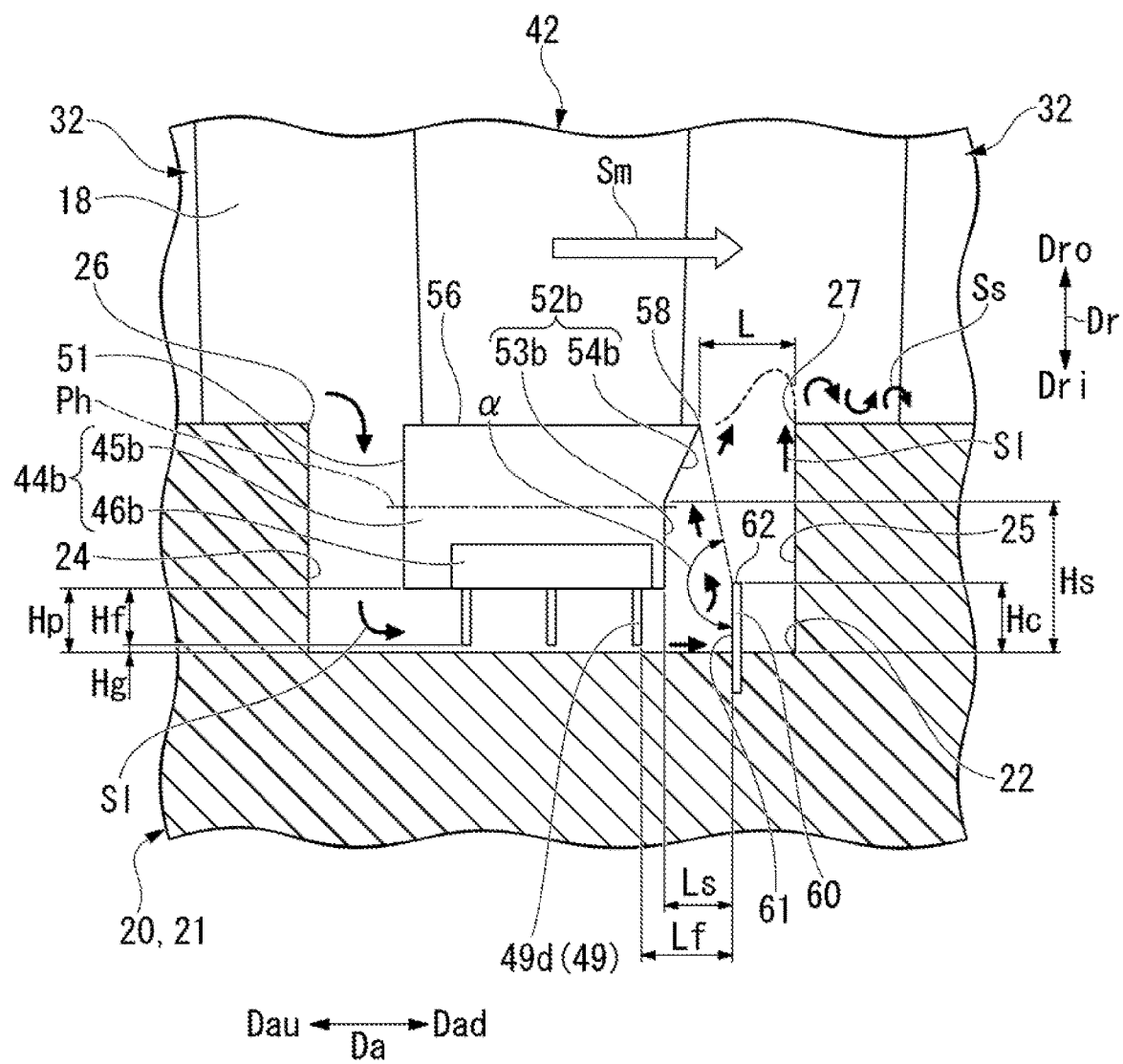
FIG. 6 is a sectional view around an inner annular groove and an inner shroud in an axial flow rotating machine according to a third embodiment of the invention.

A third embodiment of an axial flow rotating machine according to the invention will be described with reference to FIG. 6.

The axial flow rotating machine according to the embodiment is also a steam turbine similarly to the aforementioned embodiments. The position of the inclined surface 54 in the steam turbine according to the first embodiment is changed in the steam turbine according to the embodiment, and the other configurations thereof are basically the same as the configurations in the steam turbine according to the first embodiment.

A downstream-side end surface 52b of an inner shroud 44b in the embodiment also includes a parallel surface 53b that is substantially parallel to the downstream-side groove side surface 25 and an inclined surface 54b that is inclined with respect to the downstream-side groove side surface 25 similarly to the downstream-side end surface 52 in the first embodiment. The parallel surface 53b in the embodiment forms a surface of the downstream-side end surface 52b on the radially inner side Dri unlike the aforementioned respective embodiments. The inclined surface 54b is a surface that is gradually directed to the axially downstream side Dad toward the radially outer side Dro. The inclined surface 54b in the embodiment forms a surface of the downstream-side end surface 52 on the radially outer side Dro. Therefore, the inclined surface 54b is present at a position at a half of the distance between the gas path surface 56 and the seal surface 57, in other words, within a range up to a position Ph at a half of the thickness of the inner shroud 44 from the gas path surface 56. Also, since the inclined surface 54b in the embodiment forms the surface of the downstream-side end surface 52b on the radially outer side Dro as described above, the imaginary extension line from the inclined surface 54b does not intersect the downstream-side groove side surface 25 similarly to the second embodiment. Also, the inclined surface 54b in the embodiment is present at a direction of 170° with respect to the medium flow modification surface 61 from the end 62 of the medium flow modification surface 61 on the radially outer side Dro.

The relationship between the distance L from an end 58 of the inner shroud 44 on the furthest axially downstream side Dad to the downstream-side groove side surface 25 in the axial line direction Da and the distance Lf front the most-downstream seal fin 49d to the medium flow modification surface 61 in the axial line direction Da is as follows in the embodiment as well similarly to the aforementioned respective embodiments:

$$0.5 \times L \leq Lf \leq L$$

Also, the relationship between the shortest distance Ls from the end 62 of the medium flow modification surface 61 on the radially outer side Dro to the inner shroud 44b and the distance L is as follows in the embodiment as well similarly to the second embodiment:

$$Ls \leq L$$

Also, all the modification surface height Hc, the seal gap Hg, the fin height Hf, and the seal surface height Hp in the embodiment are the same corresponding dimensions in the first embodiment. In the embodiment, the inclined surface height Hs that is the distance from the groove bottom surface 23 to the end of the inclined surface 54 on the radially inner side Dri is higher than the modification surface height Hc.

In the embodiment, it is possible to allow a part of the leaking steam S1 flowing to the radially outer side between the inner shroud 44b and the downstream-side groove side surface 25 in the annular groove 22 to follow the inclined surface 54b at a position that is close to the cavity outlet port 27 in the radial direction Dr. Therefore, it is possible to reduce the flow rate component in the radial direction Dr in the flow rate components of the leaking steam S1 at the cavity outlet port 27 in the embodiment. Therefore, it is possible to further uniformize flow rate distribution in regard to the flow of the leaking steam S1 in the radial direction Dr at the cavity outlet port 27 as compared with those in the first and second embodiments.

The direction of the flow of the leaking steam S1 at the position of the end 62 of the medium flow modification surface 61 on the radially outer side Dro is a direction at an angle α of about 170° with respect to the medium flow modification surface 61. That is, the leaking steam S1 flows to the radially outer side Dro and also slightly flows to the axially upstream side Dau after meeting the medium flow modification surface 61. Also, 170° is an angle obtained as a result of flow analysis using a computer. In the embodiment, the inclined surface 54b is present at a direction of 170° with respect to the medium flow modification surface 61 from the end of the medium flow modification surface 61 on the radially outer side Dro as described above. Therefore, it is possible to allow a large part of the leaking steam S1 that has flowed substantially to the radially outer side Dro along the medium flow modification surface 61 to be directed to the inclined surface 54b in the embodiment. Therefore, it is possible to enhance the effect of the inclined surface 54b by causing the inclined surface 54b to be present in the direction of 170° with respect to the medium flow modification surface 61 from the end 62 of the medium flow modification surface 61 on the radially outer side Dro.

Further, the height Hc of the medium flow modification surface 61 is lower than the inclined surface height Hs, and the parallel surface 53b that is present on the radially inner side Dri beyond the inclined surface 54b escapes on the axially upstream side Dau beyond the end 58 of the inner shroud 44b on the furthest axially downstream side Dad while the distance Lf from the most-downstream seal fin 49d to the medium flow modification surface 61 in the axial line direction Da is shorter than the distance L. Therefore, it is possible to avoid contact between the downstream-side end surface 52b of the inner shroud 44 and the medium flow modification member 60 even if the vanes 42 move relative to the rotor 20 due to a difference in thermal expansion between the casing 10 and the rotor 20 in the embodiment.

Fourth Embodiment

Figure 7:
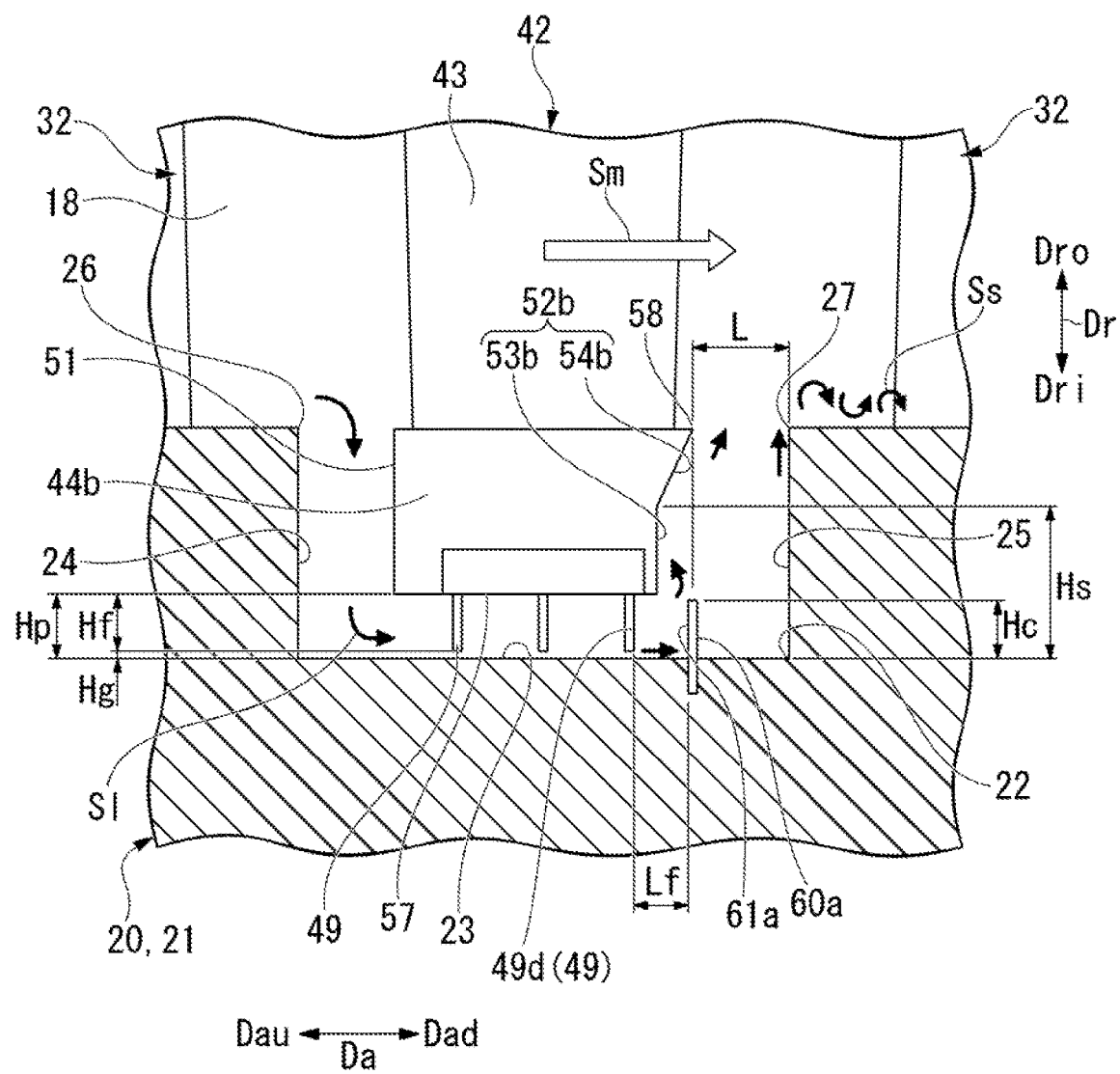
FIG. 7 is a sectional view around an inner annular groove and an inner shroud in an axial flow rotating machine according to a fourth embodiment of the invention.

A fourth embodiment of an axial flow rotating machine according to the invention will be described with reference to FIG. 7.

The axial flow rotating machine according to the embodiment is also a steam turbine similarly to the aforementioned embodiments. The position of the medium flow modification surface 61 in the steam turbine according to the third embodiment is changed in the steam turbine according to the embodiment, and the other configurations thereof are basically the same as the configurations in the steam turbine according to the third embodiment.

In the embodiment, the distance Lf from the most-downstream seal fin 49d to the medium flow modification surface 61a of the medium flow modification member 60a in the axial line direction Da is shorter than the corresponding distance in the third embodiment, and the medium flow modification surface 61a is caused to be located in a region in which the inclined surface 54b is present in the axial line direction Da. Also, the distance Lf from the most-downstream seal fin 49d to the medium flow modification surface 61a in the axial line direction Da is shorter than the distance L from the end 58 of the inner shroud 44 on the furthest axially downstream side Dad to the downstream-side groove side surface 25 in the axial line direction Da in the embodiment as well.

In this manner, it is possible to cause the position of the leaking steam S1 flowing to the radially outer side Dro along the medium flow modification surface 61a in the axial line direction Da to be located on the axially upstream side Dau as compared with those in the aforementioned respective embodiments, by shortening the distance Lf from the most-downstream seal fin 49d to the medium flow modification surface 61a in the axial line direction Da. Further, it is possible to guide a larger part of the leaking steam S1 that has flowed to the radially outer side Dro along the medium flow modification surface 61a to the inclined surface 54b in the embodiment. Therefore, the flow rate distribution in regard to the flow of the leaking steam S1 in the radial direction Dr at the cavity outlet port 27 is further uniformized, and the maximum flow rate in the radial direction Dr is also reduced in the embodiment as compared with those in the aforementioned respective embodiments.

However, if the distance Lf from the most-downstream seal fin 49d to the medium flow modification surface 61a in the axial line direction Da is shortened, a probability of contact between the downstream-side end surface 52 of the inner shroud 44 and the medium flow modification member 60a increases in a case in which the vanes 42 move relative to the rotor 20 due to a difference in thermal expansion between the casing and the rotor 20. Therefore, it is preferable to set the modification surface height Hc to be equal to or less than the seal surface height Hp, and more preferably equal to or less than the fin height Hf.

Also, although the embodiment is a modification example of the third embodiment, the medium flow modification surface 61 may be located within the region in which the inclined surface is present in the axial line direction Da similarly to the embodiment in the first and second embodiments as well.

Also, the modification surface height Hc in the aforementioned respective embodiments and a fifth embodiment, which will be described below, may be equal to or less than the seal surface height Hp or equal to or less than the fin height Hf.

Fifth Embodiment

Figure 8:
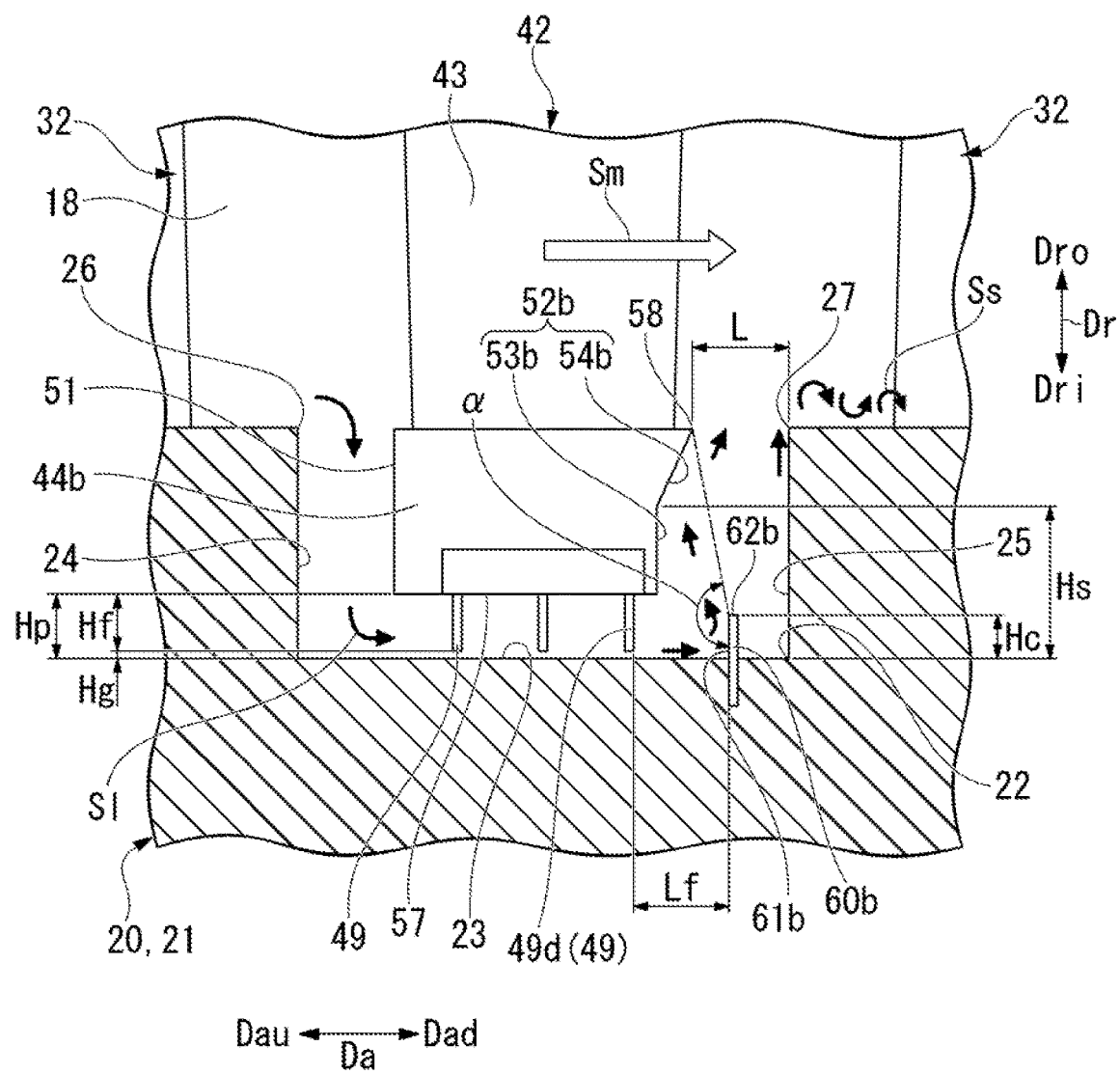
FIG. 8 is a sectional view around an inner annular groove and an inner shroud in an axial flow rotating machine according to a fifth embodiment of the invention.

A fifth embodiment of an axial flow rotating machine according to the embodiment will be described with reference to FIG. 8.

The axial flow rotating machine according to the embodiment is also a steam turbine similarly to the aforementioned embodiments. The position of the medium flow modification surface 61 in the steam turbine according to the third embodiment is changed in the steam turbine according to the embodiment as well, and the other configurations thereof are basically the same as the configurations in the steam turbine according to the third embodiment.

In the aforementioned respective embodiments, the distance Lf from the most-downstream seal fin 49d to the medium flow modification surface 61 in the axial line direction Da is equal to or less than the distance L from the end 58 of the inner shroud 44 on the furthest axially downstream side Dad to the downstream-side groove side surface 25 in the axial line direction Da. Meanwhile, the distance Lf from the most-downstream seal fin 49d to the medium flow modification surface 61b of the medium flow modification ember 60b in the axial line direction Da is longer than the distance L from the end 58 of the inner shroud 44 on the furthest axially downstream side Dad to the downstream-side groove side surface 25 in the axial line direction Da in the embodiment.

However, the inclined surface 54b is present at a direction of 170° with respect to the medium flow modification surface 61b from the end 62b of the medium flow modification surface 61b on the radially outer side Dro in the embodiment similarly to the third embodiment. Therefore, at least a part of the leaking steam S1 that has flowed substantially to the radially outer side Dro along the medium flow modification surface 61b meets the inclined surface 54, and it is possible to cause the leaking steam S1 to become a flow along the inclined surface 54 in the embodiment as well.

Therefore, the effect of the inclined surface 54 can be obtained in the embodiment as well similarly to the third embodiment.

"Modification Example of Medium Flow Modification Member"

The medium flow modification member according to the aforementioned each embodiment is a member that has a plate shape and has a part incorporated in the rotor shaft 21. That is, the medium flow modification member according to the aforementioned each embodiment is a member that is independent front the rotor shaft 21.

Figure 9:
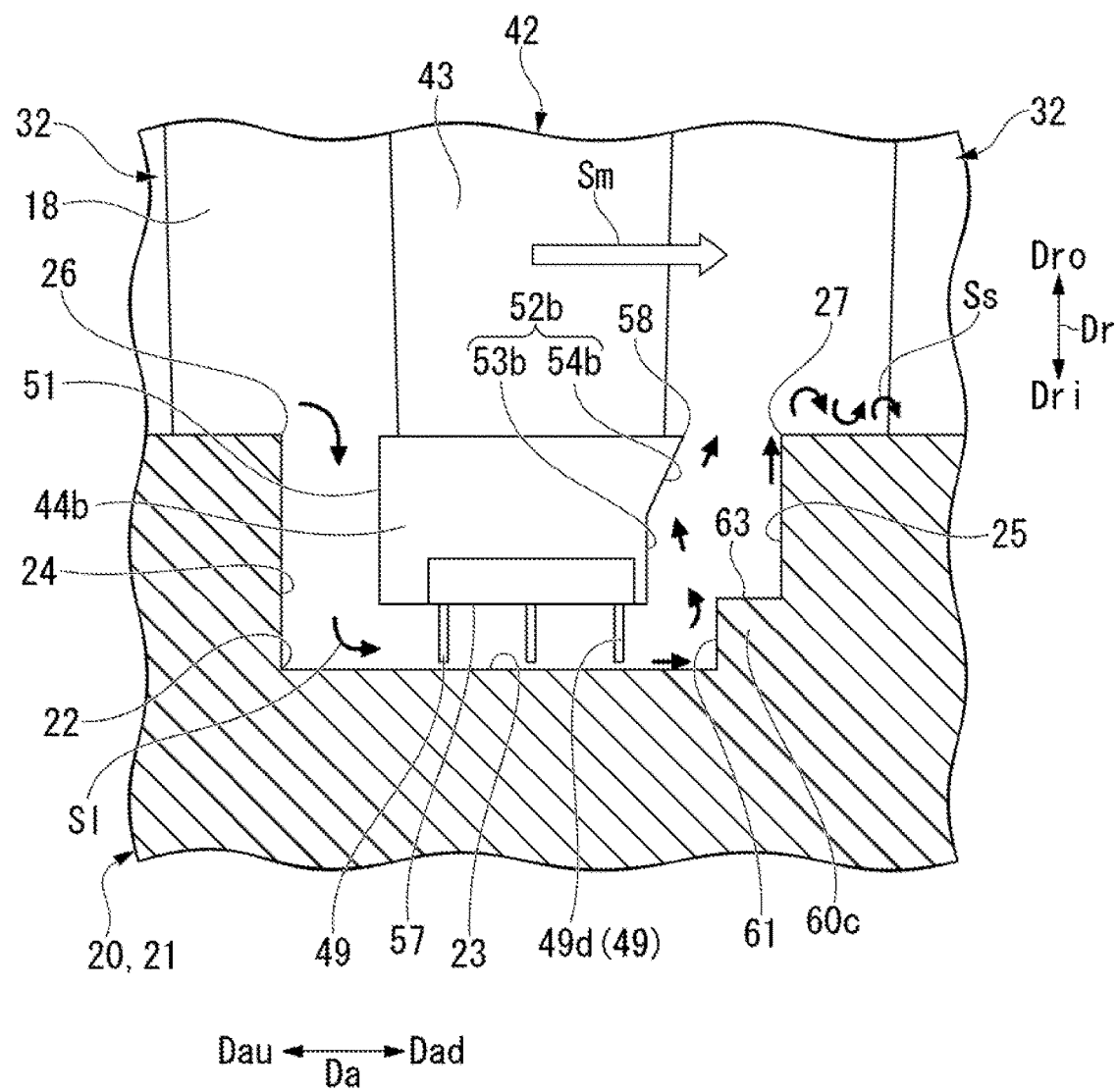
FIG. 9 is a sectional view around an inner annular groove and an inner shroud in an axial flow rotating machine including a medium flow modification member according to a modification example of the invention.

However, the medium flow modification member may be worked with the rotor shaft 21 from a rotor shaft material in a process of working the rotor shaft 21 from the rotor shaft material. That is, the medium flow modification member 60c may be integrated with the rotor shaft 21 with no bonding portion from the rotor shaft 21 as shown in FIG. 9. Also, the medium flow modification member 60c according to the modification example has a section with a block shape, and a surface 63 thereof on the radially inner side Dri is directly continuous with the downstream-side groove side surface 25. However, there is no need for the medium flow modification member 60c integrated with the rotor shaft 21 to have a section with a block shape, and there is also no need for the surface thereof on the radially inner side Dri to be continuous with the downstream-side groove side surface 25. Therefore, the medium flow modification member 60*c* integrated with the rotor shaft 21 may have a plate shape similarly to the medium flow modification members 60, 60*a*, an 60*b* in the aforementioned respective embodiments.

As described above, the height of the medium flow modification surface of the medium flow modification member and the position thereof in the axial line direction Da are important, and the connection relationship with the rotor shaft 21, the thickness of the medium flow modification member in the axial line direction Da, and the like may be arbitrarily changed.

"Modification Example of Inclined Surface"

The inclined surface according to the aforementioned each embodiment is present only in a part of the downstream-side end surface of the inner shroud.

Figure 10:
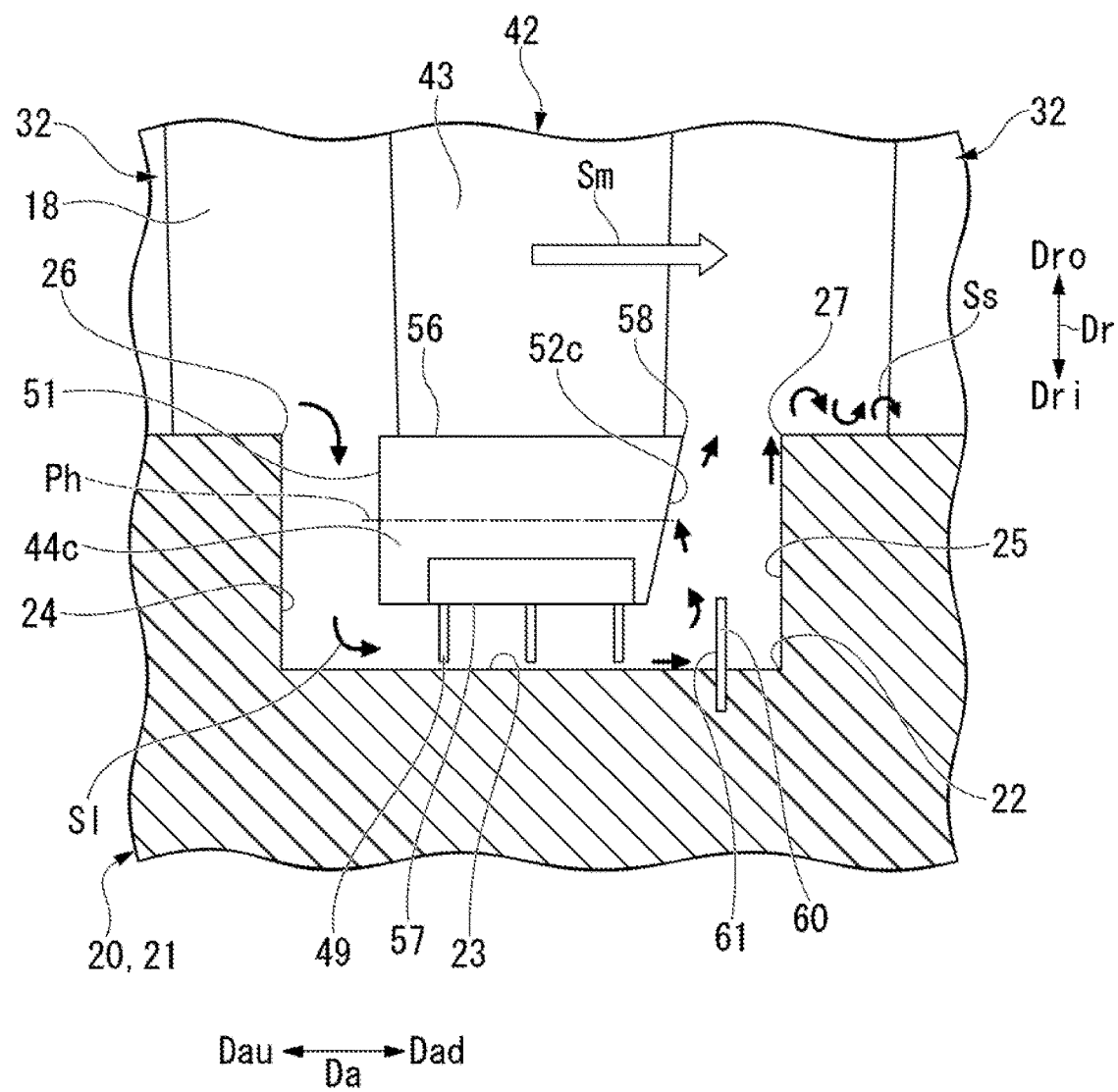
FIG. 10 is a sectional view around an inner annular groove and an inner shroud in an axial flow rotating machine including an inclined surface according to a first modification example of the invention.

However, the entire downstream-side end surface 52*c* of the inner shroud 44*c* may be an inclined surface as shown in FIG. 10.

Figure 11:
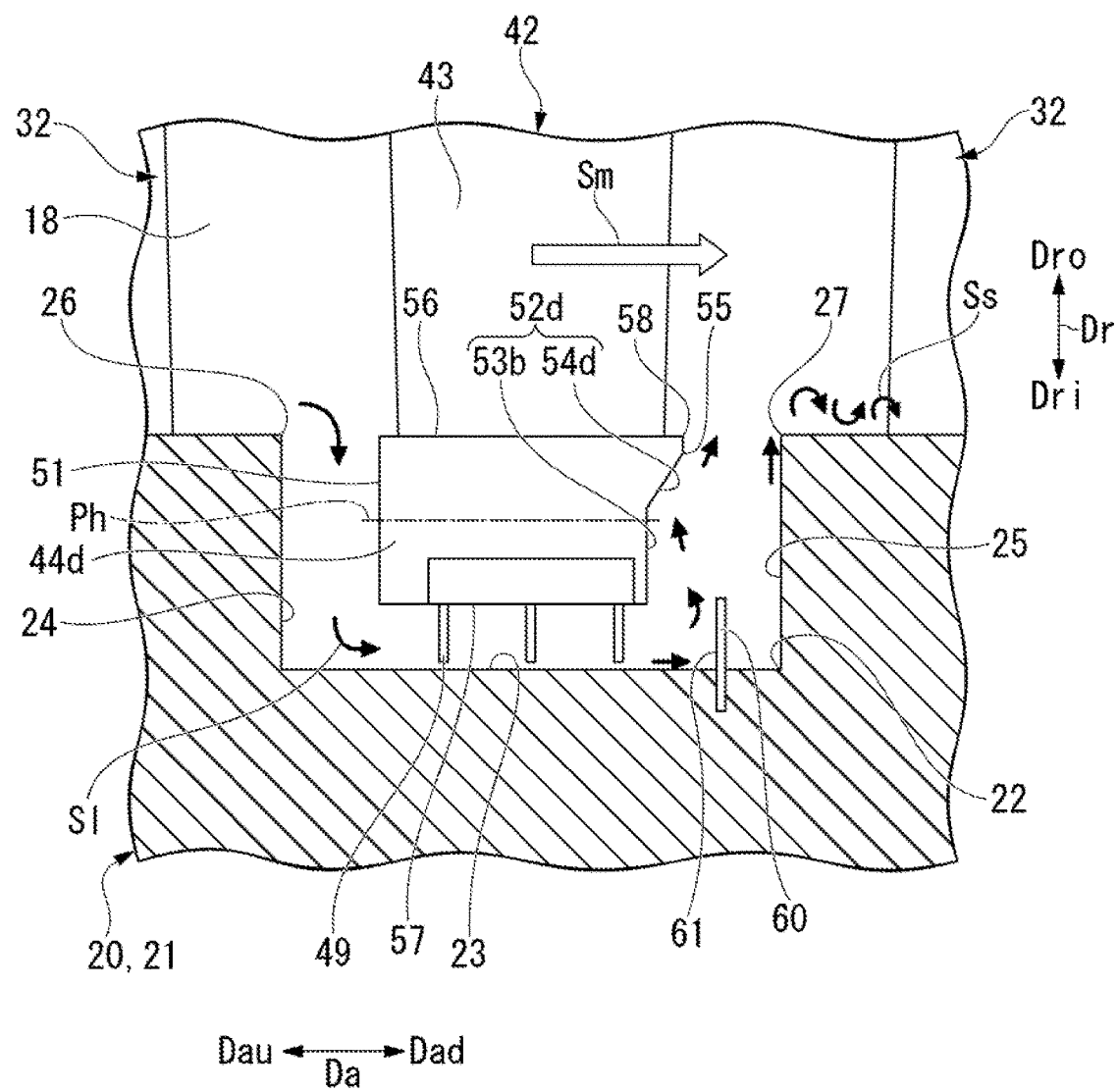
FIG. 11 is a sectional view around an inner annular groove and an inner shroud in an axial flow rotating machine including an inclined surface according to a second modification example of the invention.

Also, as shown in FIG. 11, an end 55 of the inclined surface 54*d* of the inner shroud 44*d* on the radially outer side Dro may not be directly continuous with the end 58 of the gas path surface 56 of the inner shroud lid on the axially downstream side Dad.

Also, the position f the end of the inclined surface on the radially inner side Dri may be restricted by a positional relationship with the most-downstream seal fin 49*d* in the axial line direction Da. In this case, the inclination direction of the inclined surface further approaches the orientation of the axial line direction Da as the end is located on the radially outer side Dro, as can be understood from comparison between FIGS. 10 and 11. If the inclination direction of the inclined surface 54 approaches the orientation of the axial line direction Da, the flow rate component in the radial direction Dr in the flow rate components of the leaking steam S1 flowing along the inclined surface decreases. Therefore, it is possible to further reduce the flow rate component of the leaking steam S1 in the radial direction Dr at the cavity outlet port 27 and to further curb growth of the secondary flow Ss in a case in which the position of the end is located on the radially outer side Dro than in a case in which the position of the end is located on the radially inner side Dri. As described above, the position of the end of the inclined surface on the radially inner side Dri is preferably within a range from the gas path surface 56 of the inner shroud toward the radially inner side Dri up to a position Ph at a distance of a half of the thickness of the inner shroud in the radial direction Dr.

In addition, the inclined surface may not be a flat surface and may be a curved surface. In this case, the inclined surface is preferably a curved surface with the amount of displacement toward the axially downstream side Dad gradually increasing toward the radially outer side Dro.

"Modification Example of Axial Flow Rotating Machine"

All the aforementioned respective embodiments and the aforementioned respective modification examples have exemplified steam turbines, which are a kind of axial flow rotating machine. However, the axial flow rotating machine is not limited to the steam turbines. For example, the axial flow rotating machine may be a gas turbine. Thus, a case in which the axial flow rotating machine is a gas turbine will be described below with reference to FIGS. 12 to 14 as a modification example of the axial flow rotating machine.

Figure 12:
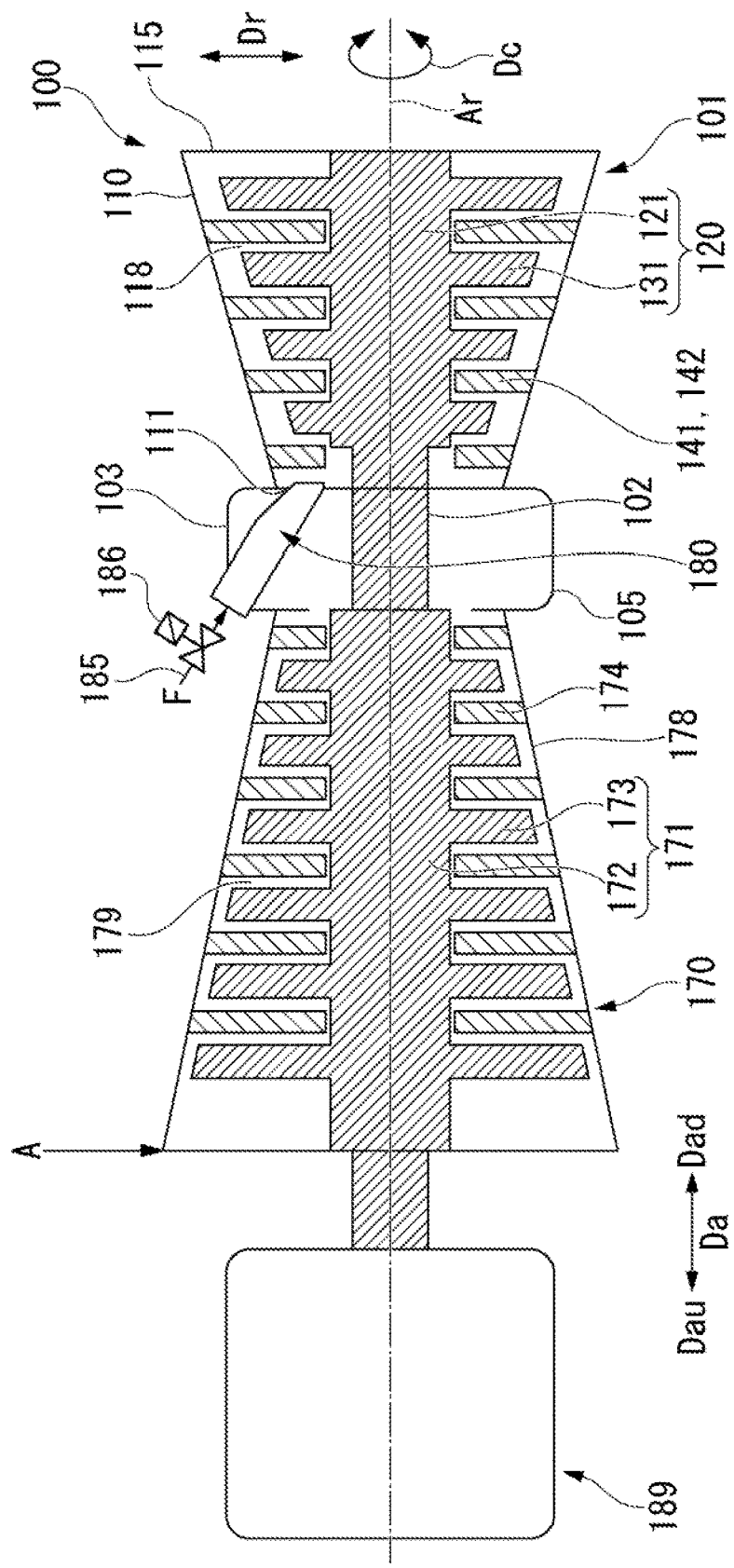
FIG. 12 is an overall sectional view of an axial flow rotating machine according to a modification example of the invention.

As shown in FIG. 12, a gas turbine 100 according to the modification example includes a compressor 170 that compresses air A, a combustor 180 that combusts a fuel F in the air compressed by the compressor 170 and generates combustion gas, a turbine 101 that is driven by the combustion gas, and an intermediate casing 105.

The compressor 170 has a compressor rotor 171 that rotates about an axial line Ar, a compressor casing 178 that covers the compressor rotor 171, and a plurality of vane rows 174. Also, a direction in which the axial line Ar extends is defined as an axial line direction Da, a circumferential direction around the axial line Ar is referred to as a circumferential direction Dc, and a direction that is vertical to the axial line Ar is defined as a radial direction Dr in the modification example as well. The side in the radial direction Dr that is closer to the axial line Ar is defined as a radially inner side Dri, and the opposite side is defined as a radially outer side Dro. Further, one side of the axial line direction Da is defined as an axially upstream side Dau, and the other side is defined as an axially downstream side Dad.

The compressor rotor 171 has a rotor shaft 172 that extends in the axial line direction Da around the axial line Ar and a plurality of blade rows 173 that are attached to the rotor shaft 172. The plurality of blade rows 173 are aligned in the axial line direction Da. Each of the blade rows 173 is configured to include a plurality of blades aligned in the circumferential direction Dc. Any one vane row 174 of the plurality of vane rows 174 is disposed on the axially downstream side Dad of each of the plurality of blade rows 173. Each vane row 174 is provided inside the compressor casing 178. Each of the vane rows 174 is configured to include a plurality of vanes aligned in the circumferential direction Dc. An annular space in a region in which the vane rows 174 and the blade rows 173 are disposed in the axial line direction Da between the rotor shaft 172 on the radially outer circumferential side Dro and the compressor casing 178 on the radially inner circumferential side Dri forms an air compression flow path 179 in which the air is compressed while flowing therethrough.

Figure 13:
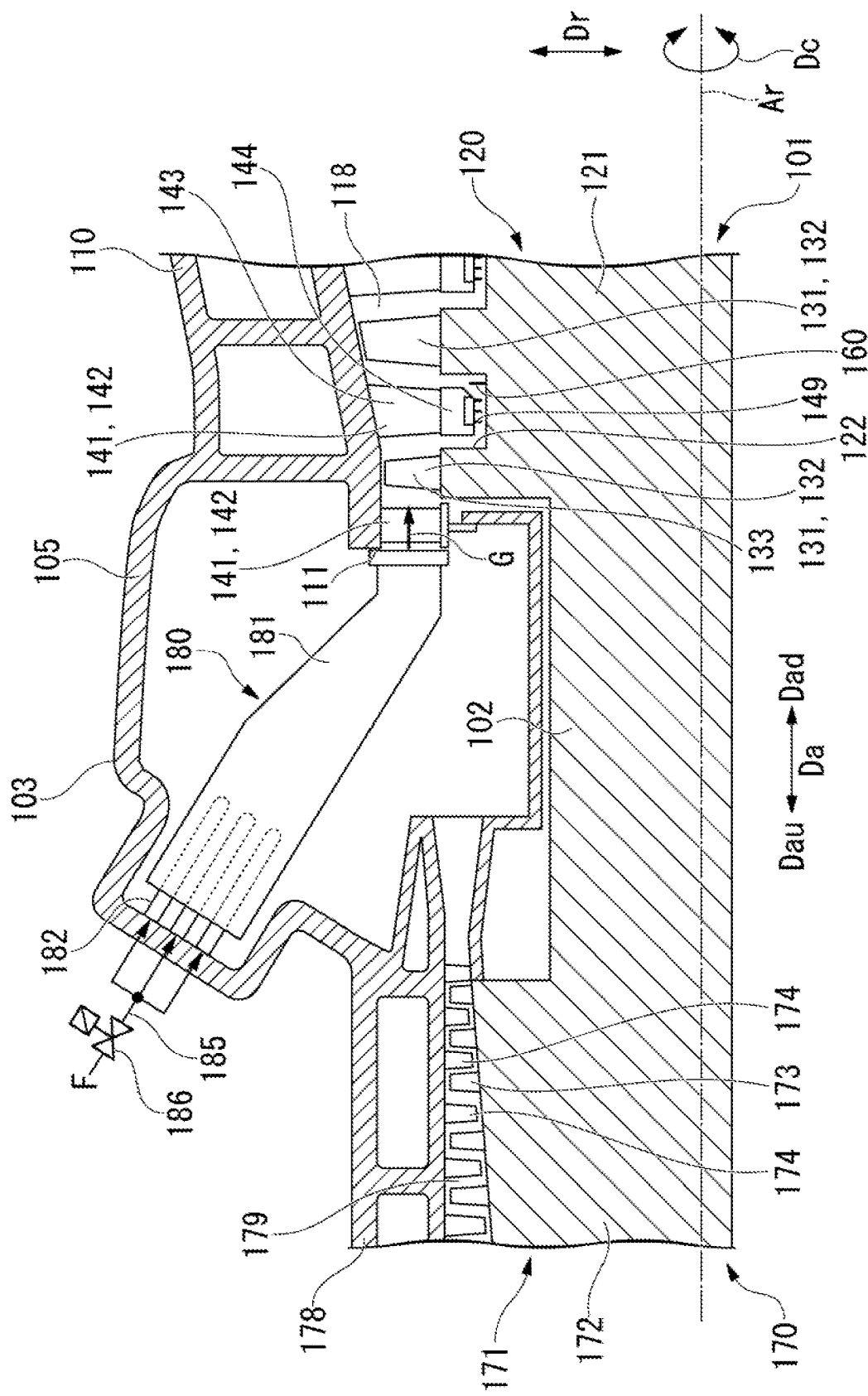
FIG. 13 is a main part sectional view of the axial flow rotating machine according to the modification example of the invention.

The combustor 180 has a combustion liner (or a transition piece) 181 that feeds combustion gas G at a high temperature and at a high pressure into the turbine 101 and a combustion injector 182 that jets the fuel F along with the air compressed by the compressor 170 into the combustion liner 181 as shown in FIG. 13. A fuel line 185 through which the fuel F flows is connected to the combustion injector 182. A fuel adjustment valve 186 is provided at the fuel line 185.

The turbine 101 is disposed on the axially downstream side Dad of the compressor 170 as shown in FIGS. 12 and 13. The turbine 101 has a turbine rotor 120 that rotates about the axial line Ar, a turbine casing 110 that covers the turbine rotor 120, and a plurality of vane row 141.

The compressor rotor 171 and the turbine rotor 120 are located on the same axial line Ar, are coupled to each other, and form the gas turbine rotor 102 as shown in FIG. 12. A rotor of a power generator 189, for example, is connected to the gas turbine rotor 102. An intermediate casing 105 is disposed between the compressor casing 178 and the turbine casing 110. The compressor casing 178, the intermediate casing 105, and the turbine casing 110 are coupled to each other and form a gas turbine casing 103. The combustor 180 is attached to the intermediate casing 105.

The turbine casing 110 has a combustion gas inlet port (medium inlet port) 111 that guides combustion gas G, which is a working medium, into the turbine casing 110 and a combustion gas outlet port (medium outlet port) 115 that discharges the combustion gas G to the outside as shown in FIGS. 12 and 13. The combustion liner 181 of the combustor 180 is connected to the combustion gas inlet port 111. The combustion gas outlet port 115 is located on the axially downstream side Dad with respect to the combustion gas inlet port 111.

The turbine rotor 120 has a rotor shaft 121 that extends in the axial line direction Da around the axial line Ar and a plurality of blade rows 131 that are attached to the rotor shaft 121. The plurality of blade rows 131 are aligned in the axial line direction Da and are disposed on the radially inner side Dri of the turbine casing 110. Each of the blade rows 131 is configured to include a plurality of blades 132 aligned in the circumferential direction Dc.

The plurality of vane rows 141 are aligned in the axial line direction Da. Each of the vane rows 141 is disposed on the axially upstream side Dau of any one blade row 131 of the plurality of blade rows 131. Each of the vane rows 141 is configured to include a plurality of vanes 142 aligned in the circumferential direction Dc. Each of the vanes 142 is disposed on the radially inner side Dri of the turbine casing 110 and is secured to the turbine casing 110.

Each blade 132 has a blade body 133 that has a blade shape and extends in the radial direction Dr. The blade body 133 is secured to the rotor shaft 121.

Figure 14:
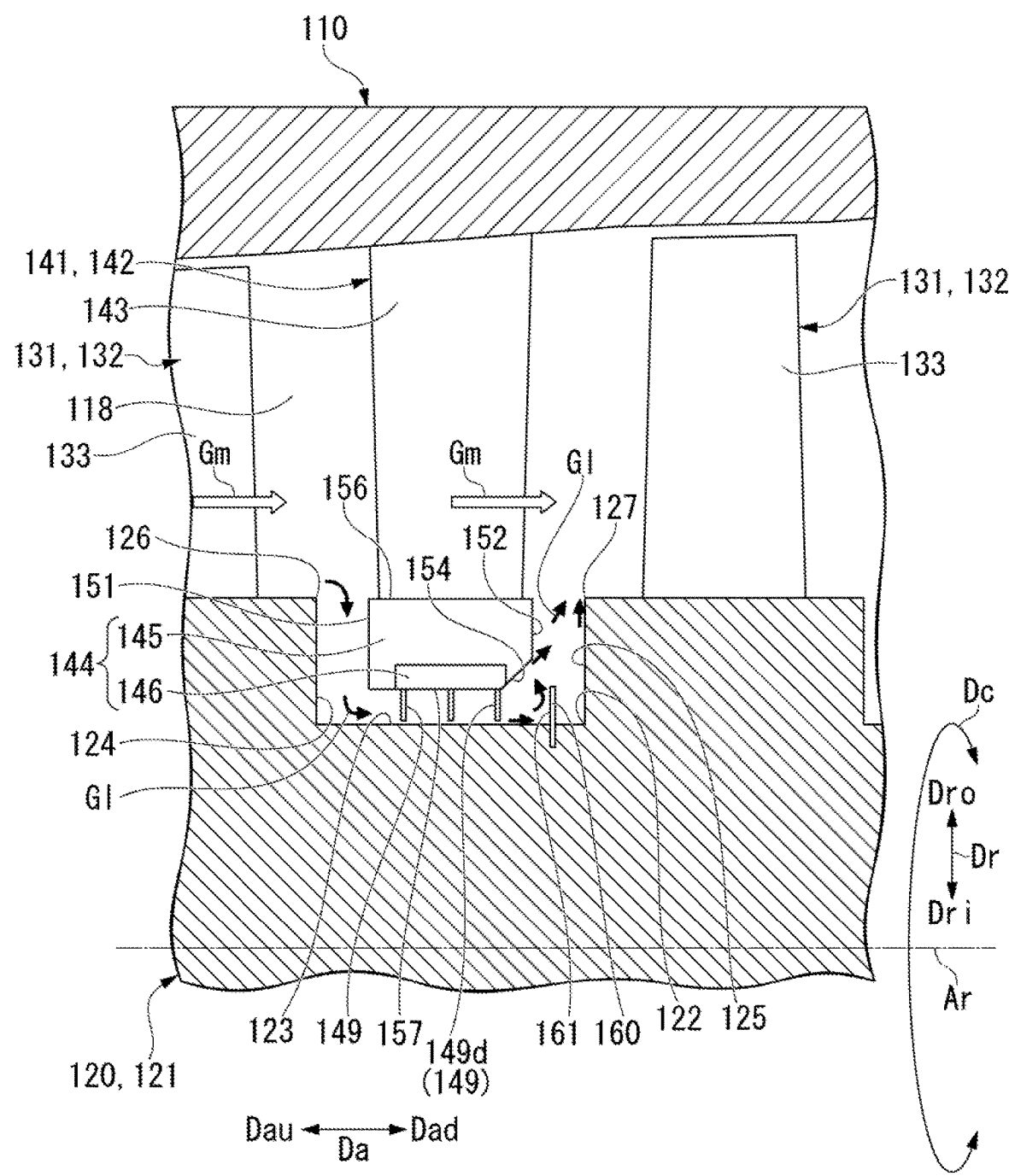
FIG. 14 is a sectional view around an annular groove and an inner shroud in the axial flow rotating machine according to the modification example of the invention.

Each vane 142 has a vane body 143 that has a vane shape and extends in the radial direction Dr, an inner shroud 144 that is provided on the radially inner side Dri of the vane body 143, and a plurality of seal fins 149 that are provided on the radially inner side Dri of the inner shroud 144 as shown in FIGS. 13 and 14. The inner shroud 144 has a shroud main body 145 and a seal ring 146 that is secured to the shroud main body 145 on the radially inner side Dri. Each vane 142 is disposed on the radially inner side Dri of the turbine casing 110 and is secured to the turbine casing 110 as described above. The plurality of seal fills 149 extending from the seal ring 146 to the radially inner side Dri are provided on the radially inner side Dri of the seal ring 146. The plurality of seal fins 149 are aligned in the axial line direction Da.

An annular groove 122 is formed at a portion of the rotor shaft 121, which faces the inner shroud 144 of the vane 142 in the radial direction Dr. The annular groove 122 is recessed toward the radially inner side Dri and has an annular shape around the axial line Ar. The inner shroud 144 and the plurality of seal fins 149 are dispose in the annular groove 122 in a non-contact state with the annular groove 122. A portion of the opening of the annular groove 122 on the axially upstream side Dau beyond the carrier shroud 144 forms a cavity inlet port 126. Also, a portion of the opening of the annular groove 122 on the axially downstream side Dad beyond the inner shroud 144 forms a cavity outlet port 127.

The annular groove 122 has a groove bottom surface 123 that is directed to the radially outer side Dro, an upstream-side groove side surface 124 that spreads from an end of the groove bottom surface 123 on the axially upstream side Dau toward the radially outer side Dro and a downstream-side groove side surface 125 that spreads from an end of the groove bottom surface 123 on the axially downstream side Dad toward the radially outer side Dro. The upstream-side groove side surface 124 and the downstream-side groove side surface 125 face each other in the axial line direction Da.

The gas turbine according to the modification example further includes a medium flow modification member 160. The medium flow modification member 160 has a plate shape, a part thereof is incorporated in the rotor shaft 121, and a remaining part projects from the rotor shaft 121 toward the radially outer side Dro. The medium flow modification member 160 has a medium flow modification surface 161. The medium flow modification surface 161 is directed to the axially upstream side Dau and spreads from the groove bottom surface 123 toward the radially outer side Dro. The medium flow modification surface 161 is located on the axially upstream side Dau beyond the downstream-side groove side surface 125 of the annular groove 122 and on the axially downstream side Dad beyond a most-downstream seal fin 149d on the furthest axially downstream side Dad among the plurality of seal fins 149.

The inner shroud 114 has an upstream-side end surface 151 that is directed to the axially upstream side Dau and faces the upstream-side groove side surface 124, a downstream-side end surface 152 that is directed to the axially downstream side Dad and faces the downstream-side groove side surface 125, a gas path surface 156 that is directed to the radially outer side Dro, and a seal surface 157 that is directed to the radially inner side Dri. The upstream-side end surface 151 and the downstream-side end surface 152 are in a back-to-back relationship in the axial line direction Da. The vane body 143 is formed on the gas path surface 156. The gas path surface 156 and the seal surface 157 are in a back-to-back relationship in the radial direction Dr. The downstream-side end surface 152 includes an inclined surface 154 that is inclined with respect to the downstream-side groove side surface 25. The inclined surface 154 is a surface that is gradually directed to the axially downstream side Dad toward the radially outer side Dro. The inclined surface 154 forms a surface of the downstream-side end surface 152 on the radially inner side Dri. The inclined surface 154 is formed over the shroud main body 145 of the inner shroud 144 and the seal ring 146 of the inner shroud 114.

A space in which the respective blade bodies 133 of the plurality of blades 132 and the respective vane bodies 143 of the plurality of vanes 142 are present is an annular space around the axial line Ar. The annular space forms a medium main flow path 118 through which the combustion gas G that is a working medium flows. The medium main flow path 118 is defined by a gas path surface 156 of the inner shroud 144 of each vane 142, a portion of an inner circumferential surface of the turbine casing 110, which faces the inner shroud 144 in the radial direction Dr, a portion of an outer circumferential surface of the rotor shaft 121, to which each blade 132 is secured, and a portion of the inner circumferential surface of the turbine casing 110, which faces each blade 132 in the radial direction Dr.

The disposition of the medium flow modification member 160 in the gas turbine 100, the respective dimensions of the medium flow modification member 160, and the angle, the position, and the like of the inclined surface 154 of the inner shroud 144 in the aforementioned modification example are similar to those in any of the first to fifth embodiments and the respective modification examples as described above.

If the configurations in the aforementioned respective embodiments and the respective modification examples are applied to the gas turbine 100 in this manner, the amount of flowing leaking combustion gas G1 flowing to the radially outer side Dro along the downstream-side groove side surface 125 in the annular groove 122 is reduced, and the flow rate of the leaking combustion gas G1 in the radial direction Dr also decreases similarly to the aforementioned examples of the steam turbines. Therefore, it is possible to curb growth of a secondary flow formed on the axially downstream side Dad beyond a position at which main combustion gas Gm flowing to the axially downstream side Dad through the medium main flow path 118 and a leaking combustion gas G1 flowing into the medium main flow path 118 from the inside of the annular groove 122 are mixed and to curb a secondary flow loss in the modification example as well similarly to the aforementioned examples of the steam turbines.

Therefore, it is possible to curb the secondary flow loss and thereby to enhance efficiency of the gas turbine as described above in the modification example as well.

INDUSTRIAL APPLICABILITY

The axial flow rotating machine according to an aspect of the invention can curb a secondary flow loss and enhance efficiency of an axial flow rotating machine.

REFERENCE SIGNS LIST

10 Steam turbine casing (or casing)
11 Inlet portion
11i: Steam inlet port (medium inlet port)
12 Body portion
13 Outer annular groove
14 Seal fin
15 Exhaust portion
15o Steam outlet port (medium outlet port)
16u Upstream-side shaft seal
16d Downstream-side shaft seal
17u Upstream-side bearing
17d Downstream-side bearing
18 Medium main flow path
20 Rotor
21 Rotor shaft
22 Inner annular groove (or annular groove)
23 Groove bottom surface
24 Upstream-side groove side surface
25 Downstream-side groove side surface
26 Cavity inlet port
27 Cavity outlet port
31 Blade row
32 Blade
33 Blade body
34 Outer shroud
35 Gas path surface
41 Vine row
42 Vane
43 Vane body
44, 44a, 44b, 44c, 44d Inner shroud
45, 45b Shroud main body
46, 46a Seal ring
49 Seal fin
49d Most-downstream seal fin
51 Upstream-side end surface
52, 52a, 52b, 52c, 52d Downstream-side end surface
53, 53a, 53b Parallel surface
54, 54a, 54b, 54d Inclined surface
55 End (of inclined surface on radially outer side)
56 Gas path surface
57 Seal surface
58 End (of inner shroud on axially most downstream side)
60, 60a, 60b, 60c Medium flow modification member
61, 61a, 61b Medium flow modification surface
62, 62b End (of medium flow modification surface on radially outer side)
100 Gas turbine
101 Turbine
102 Gas turbine rotor
103 Gas turbine casing
105 Intermediate casing
110 Turbine casing
111 Combustion gas inlet port (medium inlet port)
114 Seal fin
115 Combustion gas outlet port (medium outlet port)
118 Medium main flow path
120 Turbine rotor
121 Rotor shaft
122 Annular groove
123 Groove bottom surface
124 Upstream-side groove side surface
125 Downstream-side groove side surface
126 Cavity inlet port
127 Cavity outlet port
131 Blade row
132 Blade
133 Blade body
141 Vane row
142 Vane
143 Vane body
144 Inner shroud
145 Shroud main body
146 Seal ring
149 Seal fin
149d Most-downstream seal fin
151 Upstream-side end surface
152 Downstream-side end surface
154 Inclined surface
156 Gas path surface
157 Seal surface
160 Medium flow modification member
161 Medium flow modification surface
189 Power generator
170 Compressor
171 Compressor rotor
172 Rotor shaft
173 Blade row
174 Vane row
178 Compressor casing
179 Air compression flow path
180 Combustor
181 Combustion liner (or transition piece)
182 Fuel injector
185 Fuel line
186 Fuel adjustment valve
A Air
F Fuel
G Combustion gas
G1 Leaking combustion gas
Gm Main combustion gas
Sm Main steam
S1 Leaking steam
Ss Secondary flow
Da Axial line direction
Dau Axially upstream side
Dad Axially downstream side
Dc Circumferential direction
Dr Radial direction
Dri Radially inner side
Drio Radially outer side

The invention claimed is:

1. An axial flow rotating machine comprising:
a rotor that is configured to rotate about an axial line;
a casing that covers an outer circumferential side of the rotor;
a plurality of vanes that are provided inside the casing and are aligned in a circumferential direction with respect to the axial line; and a medium flow modification member that has a medium flow modification surface extending in a radial direction with respect to the axial line, wherein the casing has a medium inlet port that guides a working medium into the casing and a medium outlet port that is located on an axially downstream side that is a downstream side in an axial line direction, in which the axial line extends, beyond the medium inlet port, the rotor has, around the axial line, a rotor shaft that is elongated in the axial line direction, in which the axial line extends, and a plurality of blades that are aligned in the circumferential direction and are secured to the rotor shaft, both the plurality of vanes and the plurality of blades are disposed between the medium inlet port and the medium outlet port in the axial line direction, and the plurality of blades are disposed on the axially downstream side beyond the plurality of vanes, each of the plurality of vanes has a vane body that extends in the radial direction and has a vane shape, an inner shroud that is provided on a radially inner side with respect to the axial line of the vane body, and one or more seal fins that are provided on the radially inner side of the inner shroud, an annular grove, which is recessed toward the radially inner side and has an annular shape around the axial line, in which the inner shroud and the one or more seal fins are placed in a non-contact manner, is formed at the rotor shaft, the annular groove has a groove bottom surface that is directed to a radially outer side with respect to the axial line and a downstream-side groove side surface that spreads from an end of the groove bottom surface on the axially downstream side toward the radially outer side, the medium flow modification surface is directed to an axially upstream side that is on a side opposite to the axially downstream side in the axial line direction and spreads from the groove bottom surface toward the radially outer side, a distance between an end of the inner shroud on the furthest axially downstream side to the downstream-side groove side surface in the axial line direction is a distance L, the medium flow modification surface is disposed on the axially upstream side beyond the downstream-side groove side surface, and a distance Lf from a most-downstream seal fin on the furthest axially downstream side among the one or more seal fins to the medium flow modification surface in the axial line direction is equal to or less than the distance L on the axially downstream side.

2. The axial flow rotating machine according to claim 1, wherein the inner shroud has a downstream-side end surface that is directed to the axially downstream side and faces the downstream-side groove side surface, and the downstream-side end surface includes an inclined surface that is gradually directed to the axially downstream side toward the radially outer side.

3. The axial flow rotating machine according to claim 2, wherein the inclined surface is present at a direction of 170° with respect to the medium flow modification surface from an end of the medium flow modification surface on the radially outer side.

4. The axial flow rotating machine according to claim 2, wherein the inner shroud has a shroud main body in which the vane body is provided on the radially outer side and a seal ring, which is secured to the shroud main body on the radially inner side, at which the one or more seal fins are provided on the radially inner side, and the seal ring has the inclined surface.

5. The axial flow rotating machine according to claim 2, wherein the inner shroud has a gas path surface, which is directed to the radially outer side, at which the vane body is formed, and the inclined surface is present at least within a range from the gas path surface of the inner shroud to a position at a half distance of a thickness of the inner shroud in the radial direction toward the radially inner side.

6. The axial flow rotating machine according to claim 5, wherein an end of the inclined surface on the radially inner side is located within a range from the gas path surface of the inner shroud to a position at the half distance of the thickness of the inner shroud in the radial direction toward the radially inner side.

7. The axial flow rotating machine according to claim 2, wherein the medium flow modification surface is located within a region in which the inclined surface is present in the axial line direction.

8. The axial flow rotating machine according to claim 2, wherein a modification surface height that is a distance from the groove bottom surface to an end of the medium flow modification surface on the radially outer side in the radial direction is lower than an inclined surface height that is a distance from the groove bottom surface to an end of the inclined surface on the radially inner side in the radial direction.

9. The axial flow rotating machine according to claim 2, wherein an imaginary extension line from the inclined surface toward the radially outer side and toward the axially downstream side does not intersect the downstream-side groove side surface.

10. The axial flow rotating machine according to claim 1, wherein a shortest distance from an end of the medium flow modification surface on the radially outer side to the inner shroud is equal to or less than the distance L.

11. The axial flow rotating machine according to claim 1, wherein the distance Lf is a distance that is equal to or greater than 0.5 times the distance L.

12. The axial flow rotating machine according to claim 1, wherein the modification surface height that is a distance from the groove bottom surface to the end of the medium flow modification surface on the radially outer side in the radial direction is equal to or less than a seal surface height that is a distance from the groove bottom surface to an end of the inner shroud on the radially inner side in the radial direction.

13. The axial flow rotating machine according to claim 1, wherein the modification surface height that is a distance from the groove bottom surface to the end of the medium flow modification surface on the radially outer side in the radial direction is equal to or less than a fin height that is a length of the one or more seal fins in the radial direction.

14. The axial flow rotating machine according to claim 1, wherein the casing is a steam turbine casing, and the steam turbine casing has a steam inlet port that serves as the medium inlet port that guides steam as the working medium into the steam turbine casing and a steam outlet port that serves as the medium outlet port.

15. The axial flow rotating machine according to claim 1, wherein the casing is a gas turbine casing, and the gas turbine casing has a combustion gas inlet port that serves as the medium inlet port that guides combustion gas as the working medium into the gas turbine casing and a combustion gas outlet port that serves as the medium outlet port.

16. An axial flow rotating machine comprising:
a rotor that is configured to rotate about an axial line;
a casing that covers an outer circumferential side of the rotor;
a plurality of vanes that are provided inside the casing and are aligned in a circumferential direction with respect to the axial line; and
a medium flow modification member that has a medium flow modification surface extending in a radial direction with respect to the axial line,
wherein the casing has a medium inlet port that guides a working medium into the casing and a medium outlet port that is located on an axially downstream side that is a downstream side in an axial line direction, in which the axial line extends, beyond the medium inlet port,
the rotor has, around the axial line, a rotor shaft that is elongated in the axial line direction, in which the axial line extends, and a plurality of blades that are aligned in the circumferential direction and are secured to the rotor shaft,
both the plurality of vanes and the plurality of blades are disposed between the medium inlet port and the medium outlet port in the axial direction, and the plurality of blades are disposed on the axially downstream side beyond the plurality of vanes,
each of the plurality of vanes has a vane body that extends in the radial direction and has a vane shape, an inner shroud that is provided on a radially inner side with respect to the axial line of the vane body, and one or more seal fins that are provided on the radially inner side of the inner shroud,
an annular groove, which is recessed toward the radially inner side and has an annular shape around the axial line, in which the inner shroud and the one or more seal fins are placed in a non-contact manner, is formed at the rotor shaft,
the annular groove has a groove bottom surface that is directed to the radially outer side with respect to the axial line and a downstream-side groove side surface that spreads from an end of the groove bottom surface on the axially downstream side toward the radially outer side,
the medium flow modification surface is directed to an axially upstream side that is a side opposite to the axially downstream side in the axial direction and spreads from the groove bottom surface toward the radially outer side,
the inner shroud has a downstream-side end surface that is directed to the axially downstream side and faces the downstream-side groove side surface,
the downstream-side end surface includes an inclined surface that is gradually directed to the axially downstream side toward the radially outer side,
the medium flow modification surface is located on the axially upstream side beyond the downstream-side groove side surface and on the axially downstream side beyond the most-downstream seal fin on the furthest axially downstream side among the one or more seal fins, and
the inclined surface is present in a direction of 170 with respect to the medium flow modification surface from an end of the medium flow modification surface on the radially outer side.

* * * * *